(12) United States Patent
Cook et al.

(10) Patent No.: US 11,523,477 B2
(45) Date of Patent: Dec. 6, 2022

(54) MELTING FURNACE ELECTRODE HANDLING DEVICES

(71) Applicant: Corning Incorporated, Corning, NY (US)

(72) Inventors: Mark Alan Cook, Painted Post, NY (US); Raymond Eugene Fraley, Waverly, NY (US); Brian Michael Palmer, Corning, NY (US); Kevin Scott Riegel, Owego, NY (US); Tytus Lee Zimmerman, Columbia Cross Roads, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/273,171

(22) PCT Filed: Aug. 27, 2019

(86) PCT No.: PCT/US2019/048296
§ 371 (c)(1),
(2) Date: Mar. 3, 2021

(87) PCT Pub. No.: WO2020/051023
PCT Pub. Date: Mar. 12, 2020

(65) Prior Publication Data
US 2021/0329752 A1   Oct. 21, 2021

Related U.S. Application Data

(60) Provisional application No. 62/727,789, filed on Sep. 6, 2018.

(51) Int. Cl.
*H05B 7/101* (2006.01)
*H05B 7/109* (2006.01)
(Continued)

(52) U.S. Cl.
CPC ............... *H05B 7/109* (2013.01); *C03B 5/03* (2013.01); *F27B 3/085* (2013.01); *F27D 11/10* (2013.01); *H05B 7/101* (2013.01)

(58) Field of Classification Search
CPC . F27B 3/085; F27B 3/20; H05B 7/101; H05B 7/102; H05B 7/109; F27D 11/04;
(Continued)

(56) References Cited

U.S. PATENT DOCUMENTS 3,391,236 A * 7/1968 Blumenfeld ............. H05B 3/03
                                                      373/38
3,409,725 A * 11/1968 Penberthy ................ H05B 7/06
                                                      373/37
(Continued)

FOREIGN PATENT DOCUMENTS

CN          102807307 A      12/2012
CN          203429031 U  *    2/2014
(Continued)

OTHER PUBLICATIONS

International Search Report and Written Opinion of the International Searching Authority; PCT/US2019/048296 dated Nov. 26, 2019, 12 pages; European Patent Office.

*Primary Examiner* — Hung D Nguyen
(74) *Attorney, Agent, or Firm* — Matthew J. Mason

(57) ABSTRACT

Apparatuses for interfacing with an electrode provided with a melting furnace including a vessel and an electrode. In some embodiments, a support assembly (50) supports the electrode outside of the vessel, and includes a cart (102) or similar apparatus that permits or facilitates selective vertical movement of the electrode and selective transverse movement of the electrode. In some embodiments, a push assembly (52) interfaces with a rear face of the electrode outside of the vessel, and is operable to apply a pushing force onto the rear face. The push assembly can include one or more (Continued)

tracks (e.g., threaded screw) that supports a body between opposing arms of a fixed frame. The body can translate along the tracks to apply a pushing force onto the electrode.

18 Claims, 14 Drawing Sheets

(51) Int. Cl.
　　　*F27D 11/10*　　　(2006.01)
　　　*F27B 3/08*　　　(2006.01)
　　　*C03B 5/03*　　　(2006.01)
(58) Field of Classification Search
　　　CPC ..... F27D 11/10; F27D 99/0006; C03B 5/027;
　　　　　　C03B 5/0275; C03B 5/03; C03B 5/16;
　　　　　C03B 5/1675; C03B 5/185; C03B 5/225;
　　　　　　C03B 5/24; C03B 5/42; C03B 5/425;
　　　　　　　　　　　　　　　　　　C03B 5/43
　　　USPC ...................................................... 373/27–41
　　　See application file for complete search history.

(56) References Cited

U.S. PATENT DOCUMENTS

| 4,159,392 | A | * | 6/1979 | Fineo | ........................ | H05B 3/03 |
|---|---|---|---|---|---|---|
| | | | | | | 373/38 |
| 5,283,803 | A | | 2/1994 | Kottnauer et al. | | |

FOREIGN PATENT DOCUMENTS

| CN | 203429031 U | | 2/2014 |
|---|---|---|---|
| CN | 105036521 A | | 11/2015 |
| CN | 205635348 U | | 10/2016 |
| CN | 106565073 A | | 4/2017 |
| CN | 108061466 A | * | 5/2018 |
| CN | 108061466 A | | 5/2018 |
| EP | 2530057 A2 | | 12/2012 |
| JP | 2017-178709 A | | 10/2017 |

* cited by examiner even MELTING FURNACE ELECTRODE HANDLING DEVICES

CROSS-REFERENCE TO RELATED APPLICATIONS

This application is a National Stage application under 35 U.S.C. § 371 of International Application No. PCT/US2019/048296, filed on Aug. 27, 2019, which claims the benefit of priority to U.S. Provisional Application Ser. No. 62/727,789 filed on Sep. 6, 2018, the content of both of each are relied upon and incorporated herein by reference in their entirety.

BACKGROUND

Field

The present disclosure generally relates to systems and methods for melting batch materials. More particularly, it relates to apparatuses and methods for mechanically interfacing with or supporting an electrode provided as part of a system for melting batch materials, such as an electrode bank used in the melting of glass batch materials.

Technical Background

Melting furnaces can be used to melt a wide variety of batch materials, such as glass and metal batch materials, to name a few. Batch materials can be placed in a vessel having two or more electrodes and melted by applying voltage across the electrodes to drive current through the batch, thereby heating and melting the batch (or supplementing the heating energy generated by other sources (e.g., burning flame of fuel)). The life cycle of a melting furnace can depend on electrode wear. As a point of reference, the "hot face" or "front face" of the electrode is electrode end face that is nearest or in contact with batch materials within the melting furnace. The "cold face" or "rear face" is opposite the hot face, and is the electrode end face furthest from the molten batch materials. A length of the electrode is the distance between the hot and cold faces. During the melting process, the hot face of the electrode can be gradually worn down due to contact with the molten batch materials, decreasing the electrode length. At some point, the hot face may electrode may become too short and may compromise safe and/or efficient operation of the furnace.

With some melting furnace configurations, the electrode is periodically advanced into the vessel to re-position the worn hot face at a desired location relative to the vessel walls, the volume of batch materials, other electrodes, etc. For example, a length of the electrode is inserted through a passage or thru hole in a side wall of the vessel, with the cold face located outside of the vessel wall. When desired, a pushing force is applied onto the cold face, causing the electrode to advance relative to the vessel chamber.

Where the electrode has a relatively small size and/or mass, it may not be necessary to support the electrode outside of the melting vessel wall, and the device or mechanism through which an operator applies a desired pushing force can be highly simplified. With some melting furnace configurations, however, an electrode bank is utilized, consisting of an array of electrodes. The electrode bank can have a relatively large size and mass. Moreover, to extend the useful life or campaign of the melting furnace, manufactures have endeavored to employ electrodes or electrode banks with increased lengths. Under these and other conditions, existing devices for supporting an electrode or electrode bank outside the melting vessel wall and/or facilitating application of a pushing force onto the electrode or the electrode bank may be insufficient.

Accordingly, apparatuses for interfacing with or handling an electrode or electrode bank at a location outside the melting vessel wall, for example supporting the electrode or electrode bank and/or facilitating application of a pushing force onto the electrode or electrode bank, are disclosed herein, as are melting furnace systems including such apparatuses.

SUMMARY

Some embodiments of the present disclosure relate to a push assembly provided with a system for melting batch materials. The system further includes a vessel and an electrode. The vessel includes at least one side wall and defines a melting chamber. The electrode is disposed within the side wall and defines a front face (or "hot" face) facing the melting chamber and a rear face opposite the front face. The push assembly includes a fixed frame, a body, and at least one track. The fixed frame is affixed to the vessel. The body is connected to the rear face of the electrode. The track is connected to the fixed frame and the body. In this regard, the body is movable along a length of the track for moving the body relative to the fixed frame and applying a pushing force onto the rear face of the electrode. In some embodiments, the fixed frame includes a leading arm proximate the vessel and a trailing arm opposite the leading arm. With these and related embodiments, the track extends between and is connected to the leading and trailing arms. The track can be a threaded screw, and the body is adapted to provide a threaded interface with the track such that the body translates along the threaded screw with rotation of the threaded screw relative to the fixed frame. In some embodiments, one or more contact mechanisms (e.g., pressure bolt) are carried by the body and connect the body to the rear face of the electrode.

Yet other embodiments of the present disclosure relate to a support assembly provided with a system for melting batch materials. The system further includes a vessel and an electrode. The vessel includes at least one side wall and defines a melting chamber. The electrode is disposed within the side wall and defines a front face facing the melting chamber and a rear face opposite the front face. The support assembly includes a first support unit and a second support unit arranged, for example, over the first support unit to optionally form a cart. The first support unit includes a top support block and a bottom plate. The electrode is supported by the top support block. The second support unit includes an upper body and a lower body. The first support unit is supported by the upper body. The first support unit is configured to permit selective movement of the top support block relative to the bottom plate in a first plane (e.g., transverse movement). The second support unit is configured to permit selective movement of the upper body relative to the lower body in a second plane differing from the first plane. For example, the first support unit can facilitate transverse adjustment or movement of the electrode, whereas the second support unit can facilitate vertical adjustment or movement of the electrode. In some embodiments, the first support unit includes a plurality of wheels that permit lateral movement of the top support block relative to the bottom plate, and a locking device for locking the top support block relative to the bottom plate. In some embodiments, the second support unit includes a wedge body slidably disposed between the upper and lower bodies.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
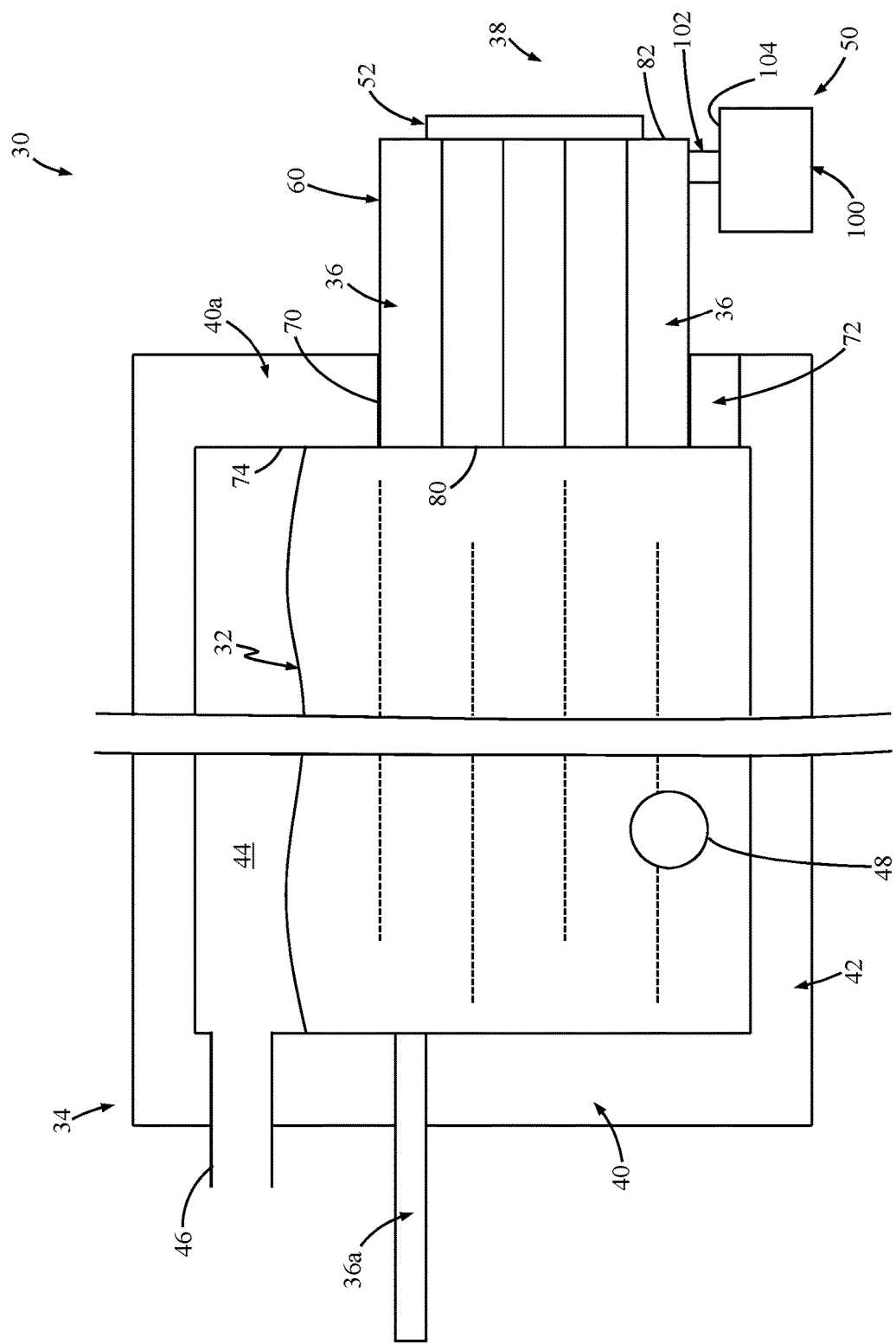
FIG. 1 is a schematic illustrating a cross-sectional view of melting furnace system including an electrode interface unit in accordance with principles of the present disclosure.

Reference will now be made in detail to various embodiments of systems and methods for melting batch materials, and in particular to various embodiments of apparatuses and methods for monitoring operation of a melting furnace, for example estimating an actual length of electrodes in a vessel of the melting furnace. Whenever possible, the same reference numerals will be used throughout the drawings to refer to the same or like parts. However, this disclosure may be embodied in many different forms and should not be construed as being limited to the embodiments set forth herein.

Embodiments of the disclosure will be discussed with reference to FIG. 1, which depicts an exemplary melting furnace system 30 for melting batch materials 32. The melting furnace 30 can include a vessel 34, at least one electrode 36, and at least one electrode interface unit 38 (referenced generally). Details on the various components are provided below. In general terms, the vessel 34 can assume various forms, and generally includes or defines side walls 40 and a floor or bottom 42 that combine to define a chamber 44. The batch materials 32 can be introduced into the chamber 44 by way of an inlet 46. The batch materials 32 can then be heated and melted in the vessel 34 by any suitable method or their combination, e.g., conventional melting techniques such as by contact with the side walls 40 and/or the floor 42, which can be heated by combustion burners (not shown) in the vessel 34 and/or by contact with the electrode(s) 36 (or electricity flowing between two electrodes 36). The melted batch materials 32 can flow out of the vessel chamber 44 by way of an outlet 48 for further processing. The electrode interface unit 38 is provided for at least one of the electrodes 36 and can include a support assembly 50 and a push assembly 52 (shown in block form). The support assembly 50 supports a portion of the electrode 36 outside of the vessel 34. The push assembly 52 facilitates selective advancement of the electrode 36 relative to the vessel 34. Some aspects of the present disclosure are directed toward one or both of the support assembly 50 and the push assembly 52.

The term "batch materials" and variations thereof are used herein to denote a mixture of precursor components which, upon melting, react and/or combine to form the final desired material composition. The batch materials can, for example, comprise glass precursor materials, or metal alloy precursor materials, to name a few. The batch materials may be prepared and/or mixed by any known method for combining precursor materials. For example, in certain non-limiting embodiments, the batch materials can include a dry or substantially dry mixture of precursor particles, e.g., without any solvent or liquid. In other embodiments, the batch materials may be in the form of a slurry, for example, a mixture of precursor particles in the presence of a liquid or solvent.

According to various embodiments, the batch materials may include glass precursor materials, such as silica, alumina, and various additional oxides, such as boron, magnesium, calcium, sodium, strontium, tin, or titanium oxide. For instance, the glass batch materials may be a mixture of silica and/or alumina with one or more additional oxides. In various embodiments, the glass batch materials include from about 45 to about 95 weight percent (wt %) collectively of alumina and/or silica and from about 5 to about 55 wt % collectively of at least one oxide of boron, magnesium, calcium, sodium, strontium, tin, and/or titanium.

The batch materials 32 can be melted according to any suitable method, e.g., conventional glass and/or metal melting techniques. For example, the batch materials 32 can added to the chamber 44 and heated to a temperature ranging from about 1100 degrees Celsius (° C.) to about 1700° C., such as from about 1200° C. to about 1650° C., from about 1250° C. to about 1600° C., from about 1300° C. to about 1550° C., from about 1350° C. to about 1500° C., or from about 1400° C. to about 1450° C., including all ranges and sub-ranges therebetween. The batch materials may, in certain embodiments, have a residence time in the vessel 32 ranging from several minutes to several hours to several days, or more, depending upon various variables, such as the operating temperature and the batch volume, and particle sizes of the constituents of the batch materials 32. For example, the residence time may range from about 30 minutes to about 3 days, from about 1 hour to about 2 days, from about 2 hours to about 1 day, from about 3 hours to about 12 hours, from about 4 hours to about 10 hours, or from about 6 hours to about 8 hours, including all ranges and sub-ranges therebetween.

In the case of glass processing, the molten glass materials can subsequently undergo various additional processing steps, including fining to remove bubbles, and stirring to homogenize the glass melt, to name a few. The molten glass can then be processed, e.g., to produce a glass ribbon, using any known method, such as fusion draw, slot draw, and float techniques. Subsequently, in non-limiting embodiments, the glass ribbon can be formed into glass sheets, cut, polished, and/or otherwise processed.

The vessel 34 can be formed of any insulating or heat-resistant material suitable for use in a desired melting process, for example, refractory materials such as zircon, zirconia, alumina, magnesium oxide, silicon carbide, silicon nitride, and silicon oxynitride, precious metals such as platinum and platinum alloys, and combinations thereof. According to various embodiments, portions (e.g., the side walls 38, the floor 40, etc.) can include an outer layer with an interior lining of heat-resistant material such as a refractory material or precious metal. The vessel 34 can have any suitable shape or size for the desired application and can, in certain embodiments, have, for example, a circular, oval, square or polygonal cross-section. The dimensions of the vessel 34, including the length, height, width, and depth, to name a few, can vary depending upon the desired application. Dimensions can be selected as appropriate for a particular process or system. While FIG. 1 illustrates the vessel 34 as having the inlet 46 and the outlet 48, which can be suitable for continuous processing, it is to be understand that other vessel configurations can be used, which may or may not include an inlet and/or outlet, and which can be used for batch or semi-batch processing.

The electrodes 36 can comprise any material suitable for the desired melting application. For example, the electrode material can be selected such that the normal wear or erosion of the electrode 36 during operation has little or no detrimental impact on the batch composition and/or final product. In various non-limiting embodiments, such as glass melting operations, one or more of the electrodes 36 can include one or more oxides or other materials that can be present in the final glass composition. For example, the electrode 36 can include an oxide already present in the batch materials 32 (e.g., nominally increasing the amount of the oxide in the final product) or an oxide not present in the batch materials 32 (e.g. introducing small or trace amounts of the oxide into the final composition). By way of non-limiting example, one or more of the electrodes 36 can include stannic tin oxide, molybdenum oxide, zirconium oxide, tungsten, molybdenum zirconium oxide, platinum and other noble metals, graphite, silicon carbide, and other suitable materials and alloys thereof.

The support assemblies and push assemblies of the present disclosure are useful with a wide variety of different electrode configurations. For example, the non-limiting embodiment of FIG. 1 reflects the support assembly 50 and the push assembly 52 as interfacing with a monolithic electrode bank or block 60 that includes a plurality of the electrodes 36 assembled or arranged relative to one another in an array-like format. In other embodiments, the support assemblies and/or the push assemblies of the present disclosure can interface with a single one of the electrodes 36. With this in mind, unless otherwise specified, "electrode" and "electrode block" can be used interchangeably throughout the present disclosure.

One or more of the electrodes 36 are assembled within and extend though a corresponding one of the side walls 40. For example, FIG. 1 illustrates the electrode bank 60 assembled to a first one of the side walls 40a. In particular, the electrode bank 60 is disposed in an opening 70 through a thickness of the first side wall 40a, and is arranged so as to be exposed to or in contact with the batch materials 32 contained in the chamber 44. In some embodiments, a glass contact block 72 is provided as part of, or inside of, the side wall 40a and supports the electrode bank 60.

The electrode bank 60 is illustrated as extending through the opening 70 and approximately flush with an inner surface 74 of the first side wall 40a (and thus exposed to the chamber 44 and the contained batch materials 32). In other embodiments, one or more of the electrodes 36 (either individually or as part of an electrode bank) can be arranged so as to project beyond the corresponding side wall inner surface. In other embodiments, one or more of the electrodes 36 (either individually or as part of an electrode bank) can be arranged to terminate within a thickness of the corresponding side wall 40a in a manner that permits the electrode 36 to directly interface with the batch materials 32 contained in the chamber 44 via the opening 70 at the inner surface 74. Regardless, upon final assembly to the vessel 34, each of the electrodes 36, as well as the electrode bank 60, can be viewed or considered as defining a front face (or "hot face") 80 opposite a rear face (or "cold face") 82. The front face 80 is the electrode end face nearest or in contact with the batch materials 32, and is open to the chamber 44 (e.g., the front face 80 is located within the chamber 44, or is within a thickness of the side wall 40a and is exposed to the batch materials 32 within the chamber 44 via the opening 70). The rear face 82 is the electrode end face farthest away from the batch materials 32, and is not within or open to the chamber 44. A region of the electrode bank 60 outside of the side wall 40a is supported by the support assembly 50 as described below.

In some embodiments, assembly of each of the electrodes 36 (either alone or as part of an electrode bank 60) to the vessel 34 (e.g., to a corresponding one of the side walls 40) is such that the electrodes 36 can be advanced relative to the corresponding side wall 40 (and thus relative to the chamber 44). For example, mounting of the electrode bank 60 to the first side wall 40a is such that the electrode bank 60 can be slid or pushed relative to the first side wall 40a, re-positioning the front face 80 relative to the chamber 44. During operation, the electrode bank 60 will experience wear over time, primarily at the front face 80. In other words, the front face 80 will physically erode toward the rear face 82. When the electrode bank 60 is stationary or fixed relative to the first side wall 40a, a physical location of the front face 80 relative to the first side wall 40a will thus change as the electrode bank 60 experiences wear. Under these circumstances and with embodiments in which the electrode bank 60 is slidably mounted to the first wall 40a, the electrode bank 60 can be periodically advanced, via the push assembly 52, toward the chamber 44 (i.e., moved in the rightward direct relative to the orientation of FIG. 1) to reposition the now-worn front face 80 at a desired location relative to the inner surface 74.

While FIG. 1 illustrates six electrodes 36 (five of which are provided with the electrode bank 60), it is to be understood that any number of electrodes may be used as required or desired for a particular application. In some embodiments, pairs of the electrodes can be aligned with one another across a dimension of the vessel 34. For example, in the non-limiting example of FIG. 1, a complementary electrode 36a is aligned with the electrode bank 60; electrical conduction can be across the electrode bank 60 and the complementary electrodes 36a and thus through the batch materials 32. In some embodiments, the complementary electrode 36a can be provided as part of an electrode bank, with paired electrode banks being located on opposite sides of the vessel 34. Other electrode arrangements are also acceptable. Furthermore, while FIG. 1 illustrates the support assembly 50 and the push assembly 52 as interfacing with the electrode bank 60 otherwise consisting of a plurality of the electrodes 36, in other embodiments the support assembly 50 and/or the push assembly 52 of the present disclosure can interface with a single one of the electrodes 36.

The electrodes 36 can have any dimension and/or shape suitable for operation in a melting furnace. For instance, in some embodiments, the electrodes 36 can be shaped as rods or blocks. The electrodes 36 can have any suitable cross-sectional shape, such as square, circular, or any other regular or irregular shape. Moreover, the initial length of the electrodes 36 can vary depending on the application and/or size of the vessel 34. In some non-limiting embodiments, the electrodes 36 can have an initial length ranging from about 10 centimeters (cm) to about 200 cm, such as from about 20 cm to about 175 cm, from about 30 cm to about 150 cm, from about 40 cm to about 125 cm, from about 50 cm to about 100 cm, or from about 60 cm to about 75 cm, including all ranges and subranges therebetween. The electrode bank 60 can also have a variety of shapes and sizes. In some non-limiting examples, the electrode bank 60 can have an initial length on the order of 36 inches, and weights (or mass) on the order of at least 3000 pounds. The support assemblies 50 and push assemblies 52 of the present disclosure are configured to robustly interface with electrode banks at least 36 includes in length and weighing at least 3000 pounds, and are equally appropriate for interfacing with smaller and/or lighter electrode configurations.

As a point of reference, the electrodes 36 in the side walls 40 are connected to a power supply (not shown), for example a power supply with an alternate voltage, which provides controlled electric current through the batch material 32 (e.g., with a paired arrangement of two electrode banks at opposing side walls 40, the electrodes 36 of one bank are connected to one pole of a power source, while the electrodes 36 of the second bank are connected to the other pole of the same power source). Thus, though not shown in FIG. 1, an electrical connection device or unit can be provided at the rear face 82 of the electrodes 36 or electrode bank 60. Further, other devices or components conventionally employed can be provided with or carried by the rear face 82, for example the rear face 82 can be connected to a water cooling jacket via an intermediate flexible metal mesh.

Support Assembly 50

With the above general descriptions in mind, the support assembly 50 is positioned outside of the vessel 34 and includes various components appropriate for supporting the electrode bank 60. In some embodiments, the support assembly 50 can include a fixture 100 and a cart 102. The fixture 100 is mounted to a ground structure otherwise supporting the vessel 34 (e.g., a floor of the building housing the vessel 34) and provides an upper surface 104 on which the cart 102 is maintained. The fixture 100 can have a variety of different constructions (e.g., materials, shapes, etc.) appropriate for supporting a weight of the electrode bank 60. The cart 102 is disposed between the upper surface 104 and the electrode bank 60. Some aspects of the present disclosure are directed toward embodiments of the cart 102.

Figure 2A:
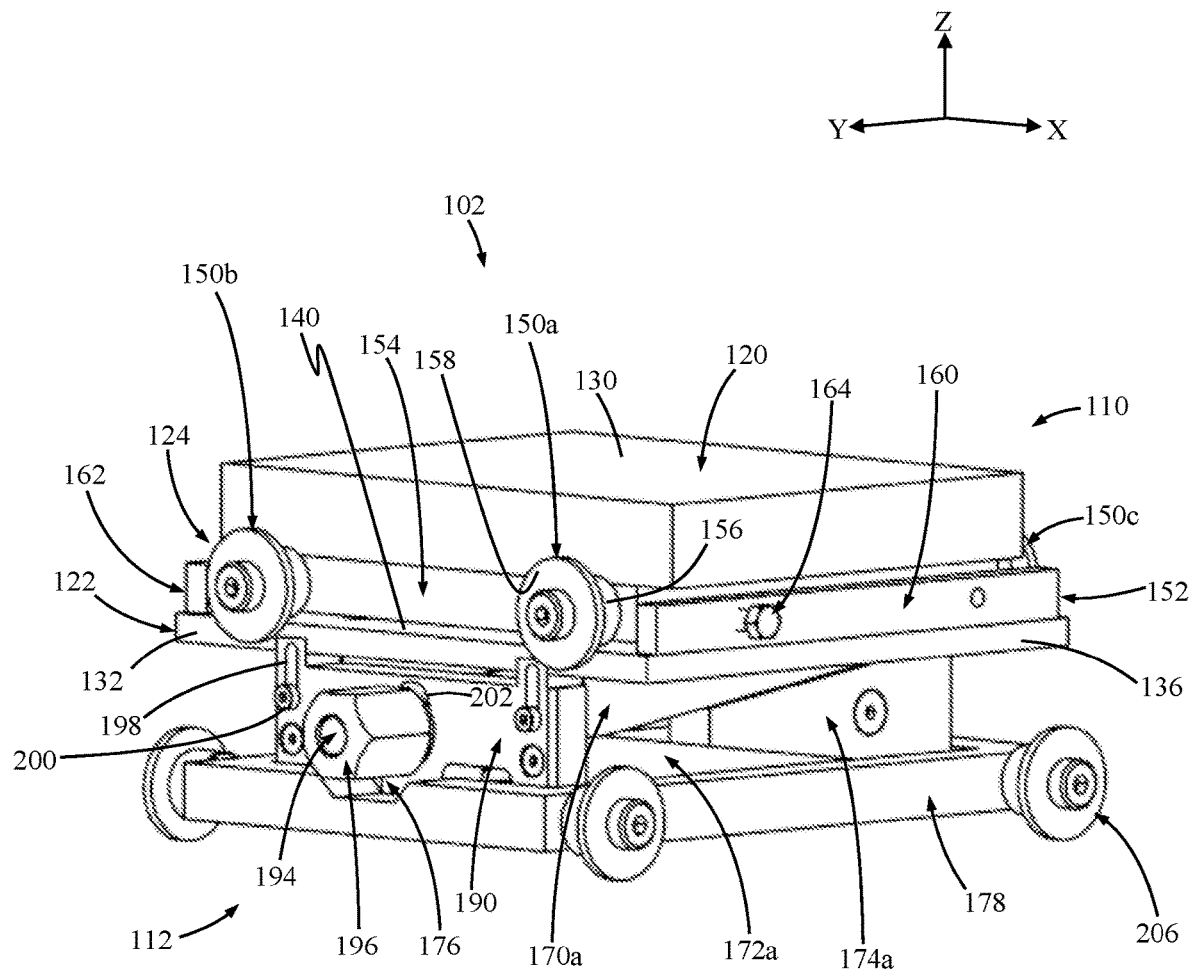
FIG. 2A is a front perspective view of a cart useful with a support assembly of the electrode interface unit of FIG. 1.
Figure 2B:
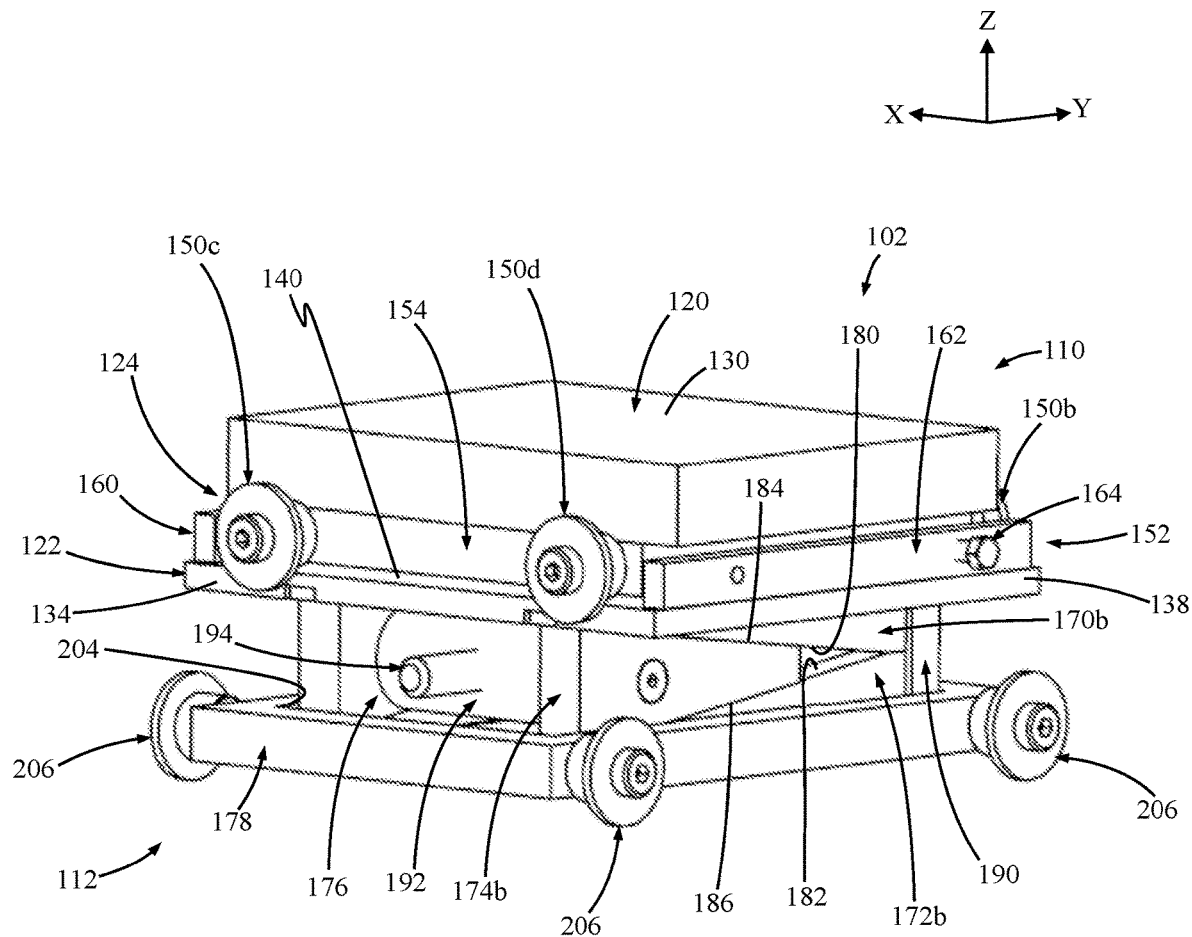
FIG. 2B is a rear perspective view of the cart of FIG. 2A.

One example of the cart 102 is shown in greater detail in FIGS. 2A and 2B. The cart 102 includes a first support unit 110 (referenced generally) and a second support unit 112 (referenced generally). As described in greater detail below, the first support unit 110 is in contact with the electrode bank 60 (FIG. 1) and is configured to facilitate movement of the electrode bank 60 relative to other components of the cart 102 in a first plane or direction. The second support unit 112 supports the first support unit 110 relative to the fixture 100 (FIG. 1), and is configured to facilitate movement of the electrode bank 60 in a second plane or direction. For example, relative to the X, Y, Z coordinate system identified in the views, the first support unit 110 facilitates lateral movement in a direction of the X axis, and the second support unit 112 facilitates vertical movement in a direction of the Z axis.

The first support unit 110 includes a top support block 120, a bottom plate 122, and a lateral expansion mechanism 124 (referenced generally). The top support block 120 is retained relative to the bottom plate 122 by the expansion mechanism 124 in a manner permitting selective movement (e.g., selective lateral movement) of the top support block 120 (i.e., the top support block 120 is allowed or caused to move relative to the bottom plate 122 in response to an input force under some circumstances, and remains or is held at a selected position relative to the bottom plate 122 under other circumstances) as described below.

The top support block 120 is generally configured for directly contacting and supporting (e.g., under the force of gravity) an electrode or electrode bank (such as the electrode bank 60 (FIG. 1) described above) and can assume a variety of forms. The top support block 120 defines a bearing surface 130 against which the electrode or electrode bank is received. In some embodiments, the top support block 120 is configured such that the bearing surface 130 is substantially flat or planar (i.e., within 10 percent of a truly flat or planar surface) and maintains the substantially flat or planar shape when subjected to loads on the order of at least 3000 pounds. The top support block 120 can be formed of an appropriate isolation material such as electrically insulative, high temperature stable materials, for example a fiber reinforced structural alumina composite available under the trade name RS-100 from ZIRCAR Refractory Composites, Inc. In some optional embodiments, the first support unit 110 can include a frame defining a pocket in which the top support block 120 is loosely held. While the first support unit 110 is illustrated as including a single one of the top support blocks 120, in other embodiments, two or more blocks (or other isolation bodies or assemblies) can be provided and collectively form the bearing surface 130. In some examples, the top support block 120 can have a thickness of at least 0.5 inch for electrical isolation, although other dimensions are also acceptable.

The bottom plate 122 can be a substantially planar body (i.e., within 10 percent of a truly planar body), formed of a material a configured to maintain its structural integrity under expected forces (e.g., when subjected to loads on the order of at least 3000 pounds). For example, the bottom plate 122 can be stainless steel, although other materials are also envisioned. The bottom plate 122 can have various shapes and sizes, and in some embodiments is sized in accordance with other features of the cart 102 as described in greater detail below. In more general terms, a shape of the bottom plate 122 defines opposing first and second side edges 132, 134, opposing first and second end edges 136, 138, and a guide surface 140.

The lateral expansion mechanism 124 can assume various forms conducive to selective lateral adjustment or movement of the top support block 120 relative to the bottom plate 122, and in some embodiments can include a plurality of wheels, such as wheels 150a, 150b, 150c, 150d, and a locking device 152 (referenced generally). The wheels 150a, 150b, 150c, 150d are arranged to roll, slide or otherwise move along the guide surface 140. The top support block 120 is connected to the wheels 150a, 150b, 150c, 150d such that the top support block 120 moves relative to the bottom plate 122 with rotation (or other movement) of the wheels 150a, 150b, 150c, 150d along the guide surface 140. For example, the wheels 150a, 150b, 150c, 150d can be rotatably mounted to a rigid frame 154 that in turn carries the top support block 120. Other formats indirectly connecting the wheels 150a, 150b, 150c, 150d with the top support block 120 are also acceptable. In other embodiments, the wheels 150a, 150b, 150c, 150d can be directly, rotatably mounted to the top support block 120. Regardless, the wheels 150a, 150b, 150c, 150d and the bottom plate 122 are, in some embodiments, collectively configured to limit or prevent overt transverse displacement or movement in a direction of the Y axis. For example, each of the wheels 150a, 150b, 150c, 150d can include a rolling surface 156 and a flange 158 (identified for the first wheel 150a in FIG. 2A). The flange 158 projects radially relative to the rolling surface 156, defining an outer diameter greater than a diameter of the rolling surface 156. The wheels 150a, 150b, 150c, 150d are arranged relative to the bottom plate 122 such that the corresponding rolling surface 156 contacts the guide surface 140, and the flange 158 projects beyond a corresponding one of the side edges 132, 134 (e.g., the flange 158 of the first wheel 150a projects beyond the first side edge 132). With this construction, the wheels 150a, 150b, 150c, 150d can each roll along or relative to the guide surface 140 via the corresponding rolling surface 156 to effect lateral movement of the top support block 120 in a direction of the X axis. Further, the wheels 150a, 150b, 150c, 150d are effectively transversely captured relative to the side edges 132, 134 in a direction of the Y axis via an interface between the flange 158 and the corresponding side edge 132. For example, an interface between the flange 158 of the first and second wheels 150a, 150b with the first side edge 132 prevents the top support block 120 from overtly moving in a direction of the second side edge 134. Similarly, an interface between the flange 158 of the third and fourth wheels 150c, 150d with the second side edge 134 prevents the top support block 120 from overtly moving in a direction of the first side edge 132. While the lateral expansion mechanism 124 is shown as including four of the wheels 150a, 150b, 150c, 150d, any other number, either greater or lesser, is also acceptable. Further, the lateral expansion mechanism 124 can assume other forms that facilitate lateral movement of the top support block 120 relative to the bottom plate 122 that may or may not include wheels.

The locking device 152 is generally configured to limit the extent of lateral movement (in a direction of the X axis) of the top support block 120 relative to the bottom plate 122 and to selectively lock the top support block 120 at a desired lateral position. In some non-limiting embodiments, the locking device 152 can include opposing stop members 160, 162 and locking members 164. The stop members 160, 162 can be rigid bodies (e.g., stainless steel blocks) assembled to and projecting upwardly from the guide surface 140 adjacent a respective one of the end edges 136, 138. The stop members 160, 162 are sized and shaped to contact the frame 154 as the top support block 120 moves in a direction of the corresponding end edge 136, 138. For example, as the frame 154 (and thus the top support block 120) moves laterally in a direction of the first end edge 136, the first stop member 160 prevents the frame 154 (and thus the top support block 120) from moving beyond the first end edge 136. Other components or constructions for limiting overt lateral movement of the top support block 120 relative to the bottom plate 122 are also acceptable.

The locking members 164 can assume various forms appropriate for locking the top support block 120 relative to the bottom plate 122 at a desired lateral position or location. In some embodiments, the locking members 164 can be bolts threadably secured to a respective one of the stop members 160, 162. Once the top support block 120 is at a desired lateral position, the bolts 164 are rotated or otherwise advanced into contact with the frame 154 (at opposing sides thereof), thereby prevent further lateral movement. Loosening of the bolts 164 permits lateral movement of the frame 154, and thus of the top support block 120, relative to the bottom plate 122 in a direction of the X axis. Other locking device constructions that may or may not include threaded bolts are also acceptable.

The second support unit 112 can include at least one upper body 170a, 170b, at least one lower body 172a, 172b, at least one wedge body 174a, 174b, and actuator mechanism 176 (referenced generally), and a base 178. Each of the upper bodies 170a, 170b is secured to the bottom plate 122. Each of the lower bodies 172a, 172b is secured to the base 178 and is vertically aligned with a corresponding one of the upper bodies 170a, 170b. Respective ones of the wedge bodies 174a, 174b are disposed between vertically aligned ones of the upper and lower bodies (i.e., the first wedge body 174a is between the first upper and lower bodies 170a, 172a, and the second wedge body 174b is between the second upper and lower bodies 170b, 172b). The actuator mechanism 176 is configured to selectively alter a position of the wedge bodies 174a, 174b relative to the upper and lower bodies 170a, 170b, 172a, 172b to effect a desired vertical spacing (in a direction of the Z axis) between the bottom plate 122 and the base 178. With these and similar constructions, the second support unit is configured to permit selective movement of the upper bodies 170a, 170b relative to the lower bodies 172a, 172b (i.e., the upper bodies 170a, 170b are caused or allowed to move relative to the lower bodies 172a, 172b in response to an input force under some circumstances, and remain or are held at a selected position relative to the lower bodies 172a, 172b under other circumstances). Further, the base 178 can be configured to promote interface of the cart 102 with the fixture 100 (FIG. 1) as described below.

The upper bodies 170a, 170b can have a similar or identical construction, generally sized and shaped to provide a sloped surface 180 (identified for the second upper body 170b in FIG. 2B) upon final assembly to the bottom plate 122. For example, the upper bodies 170a, 170b can each have a triangular shape. Regardless, upon final assembly, the sloped surface 180 is located opposite the bottom plate 122. The sloped surface 180 can be substantially planar (i.e., within 10 degrees of a truly planar surface) and is arranged to taper toward the bottom plate 122 in a direction from the first side edge 132 toward the second side edge 134. The upper bodies 170a, 170b can be formed from a rigid, structurally robust material selected to maintain a shape of the sloped surface 180 under expected forces. For example, in some non-limiting embodiments, the upper bodies 170a, 170b are formed of a silicon-bronze material, although other materials (e.g., stainless steel) are also acceptable.

The lower bodies 172a, 172b can be similar or identical to the upper bodies 170a, 170b, and each are sized and shaped to provide a sloped surface 182 (identified for the second lower body 172b in FIG. 2B) upon final assembly to the base 178. The sloped surface 182 can be substantially planar as described above. Upon final assembly, the sloped surface 182 of the lower bodies 172a, 172b is arranged as a mirror image of the sloped surface 180 of the corresponding upper body 170a, 170b (e.g., the sloped surface 182 of the second lower body 172b is a mirror image of the sloped surface 180 of the second upper body 170b). The lower bodies 172a, 172b can be made from the same rigid material as the upper bodies 170a, 170b, for example a silicon-bronze material.

The wedge bodies 174a, 174b can have a similar or identical construction, and are generally sized and shaped to nest between the sloped surfaces 180, 182 of the corresponding aligned pair of upper and lower bodies 170a/172a, 170b/172b in a sliding wedge-type fashion. For example, each of the wedge bodies 174a, 174b defines opposing inclined surfaces 184, 186 (identified for the second wedge body 174b). The inclined surfaces 184, 186 can be substantially planar as described above. Upon final assembly, a plane of the first inclined surface 184 mimics a plane of the sloped surface 180 of the corresponding upper body 170a, 170b, and a plane of the second inclined surface 186 mimics a plane of the sloped surface 182 of the corresponding lower body 172a, 172b. With this construction, each of the wedge bodies 174a, 174b can move relative to the corresponding pair of upper and lower bodies 170a/172a, 170b/172b in a direction of the Y axis, with the first inclined surface 184 sliding along the sloped surface 180 of the corresponding upper body 170a, 170b, and the second inclined surface 186 sliding along the slope surface 182 of the corresponding lower body 172a, 172b.

While the second support unit 112 has been described as providing two sets of wedged interfaces (i.e., the first upper body 170a, first wedge body 174a, first lower body 172a, and the second upper body 170b, second wedge body 174b, second lower body 172b), any other number, either greater or lesser, is also acceptable.

The actuator mechanism 176 can assume various forms appropriate for user-prompting movement of the wedge bodies 174a, 174b relative to the upper and lower bodies 170a, 170b, 172a, 172b, and in some embodiments includes a side panel 190, a carriage 192, a shaft 194, and an actuator 196. The side panel 190 is a rigid body (e.g., stainless steel) fixed to and extending vertically between the bottom plate 122 and the base 178. The lower bodies 172a, 172b are fixed to the side panel 190. The upper bodies 170a, 170b are slidably connected to the side panel 190. For example, the side panel 190 can define vertical slots 198 (one of which is identified in FIG. 2A) within which a pin 200 (one of which is identified in FIG. 2A) is slidably received. The pin 200, in turn, is attached to a corresponding one of the upper bodies 170a, 170b. With this configuration, the upper bodies 170a, 170b can move vertically (i.e., direction of the Z axis) relative to the side panel 190 (with the attached pin 200 sliding in the corresponding vertical slot 198), but is essentially prevented from moving relative to the side panel 190 in other directions (i.e., direction of the X axis and direction of the Y axis). The lower bodies 172a, 172b are spatially fixed relative to the side panel 190.

The carriage 192 can be a rod or similar structure sized to nest between the opposing sets of upper and lower bodies 170a/172a, 170b/172b. The wedge bodies 174a, 174b are attached one of the opposing ends, respectively, of the carriage 192. With this construction, the carriage 192 locates and retains each of the wedge bodies 174a, 174b between the corresponding pair of upper and lower bodies 170a/172a, 170b/172b (e.g., the first wedge body 174a is maintained between the first upper body 170a and the first lower body 172a).

The shaft 194 is coupled to, and projects from, the carriage 192. In some embodiments, the shaft 194 can be threadably coupled to the carriage 192. Alternatively, a more fixed relationship between the shaft 194 and the carriage 192 can be established. Regardless, the shaft 194 extends from the carriage 192 and passes through a hole 202 (partially visible in FIG. 2A) in the side panel 190. The actuator 196 is connected to the shaft 194 adjacent the side panel 190 as shown, and in some embodiments can be akin to a bolt head. A size or outer dimension of the actuator 196 is greater than a size or dimension of the hole 202. With this construction, the actuator 196 abuts against a face of the side panel 190.

During use, the shaft 194 rotates with user-caused rotation of the actuator 196, causing the carriage 192 to move toward or away from the side panel 190 (i.e., in a direction of the Y axis) due to the threaded coupling of the shaft 194 with the carriage 192. Alternatively, the shaft 194 can be fixed to the carriage 192 and threadably coupled to the actuator 196. Regardless, the wedge bodies 174a, 174b move in tandem with the carriage 192 toward or away from the side panel 190, sliding along the corresponding sloped surfaces 180, 182, whereas the upper and lower bodies 170a, 170b, 172a, 172b remain spatially fixed in a direction of the Y axis. Movement of the wedge bodies 174a, 174b relative to the side panel 190 in response to rotation of the actuator 196 thus changes a vertical spacing or gap (i.e., in a direction of the Z axis) between the first upper and lower bodies 170a, 172a and between the second upper and lower bodies 170b, 172b. Relative to the upright orientation of FIGS. 2A and 2B, under circumstances where the base 178, and thus the lower bodies 172a, 172b, is spatially fixed in a direction of the Z-axis (e.g., when the cart 102 is placed on the fixture 100 (FIG. 1)), movement of the wedge bodies 174a, 174b toward the side panel 190 will thus cause the upper bodies 170a, 170b to displace vertically upwardly relative to the base 178 (i.e., transition from the arrangement of FIG. 2A and FIG. 2B). Under these same circumstances, movement of the wedge bodies 174a, 174b away from the side panel 190 permits the upper bodies 170a, 170b to move vertically downwardly toward the base 178 (e.g., under the force of gravity). Other actuator mechanism formats capable of facilitating user-prompted vertical movement of the bottom plate 120 relative to the base 178 are also acceptable that may or may not incorporate the rotatable shaft 194.

The base 178 is sized and shaped to support other components of the cart 102 described above, and is formed of a rigid material (e.g., stainless steel) selected to maintain its structural integrity under expected forces. In some non-limiting embodiments, the base 178 can define a cavity 204 (identified in FIG. 2B) within which the lower bodies 172a, 172b and the side panel 190 are assembled. The cavity 204 can be sized to receive the wedge bodies 174a, 174b in a lowered arrangement of the cart 102 (i.e., the arrangement of FIGS. 2A and 2B), thus reducing an overall profile or footprint of the cart 102. Other constructions are also acceptable. In some non-limiting embodiments, two or more wheels 206 are rotatably coupled to the base 178. The wheels 206 can assume various forms, and can be configured to movably capture the cart 102 relative to the fixture 100 (FIG. 1) as described in greater detail below. In other embodiments, the wheels 206 can be omitted.

Figure 3A:
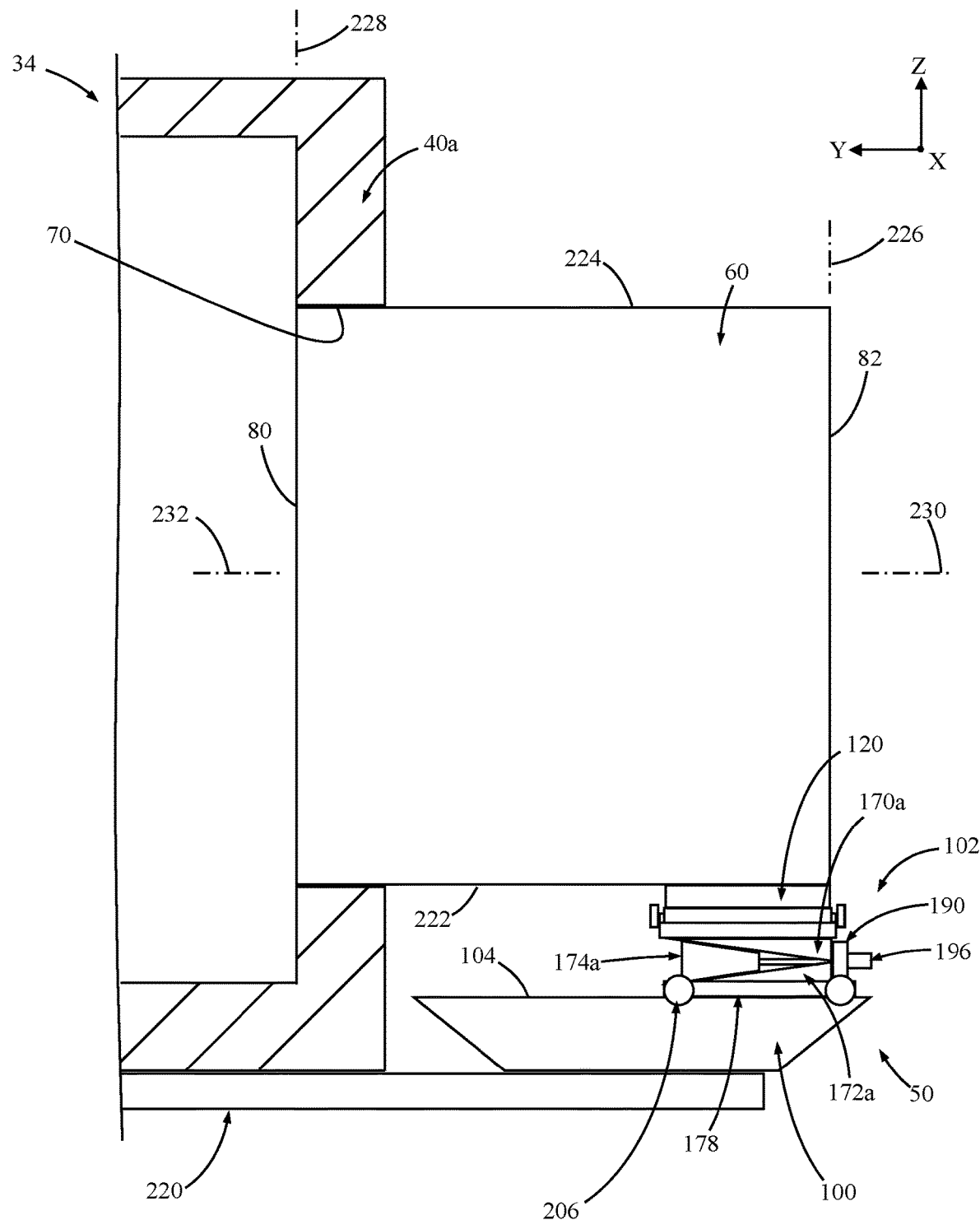
FIG. 3A is a simplified side cross-sectional view of a portion of the melting furnace system of FIG. 1, including the cart of FIG. 2A supporting an electrode bank.
Figure 3B:
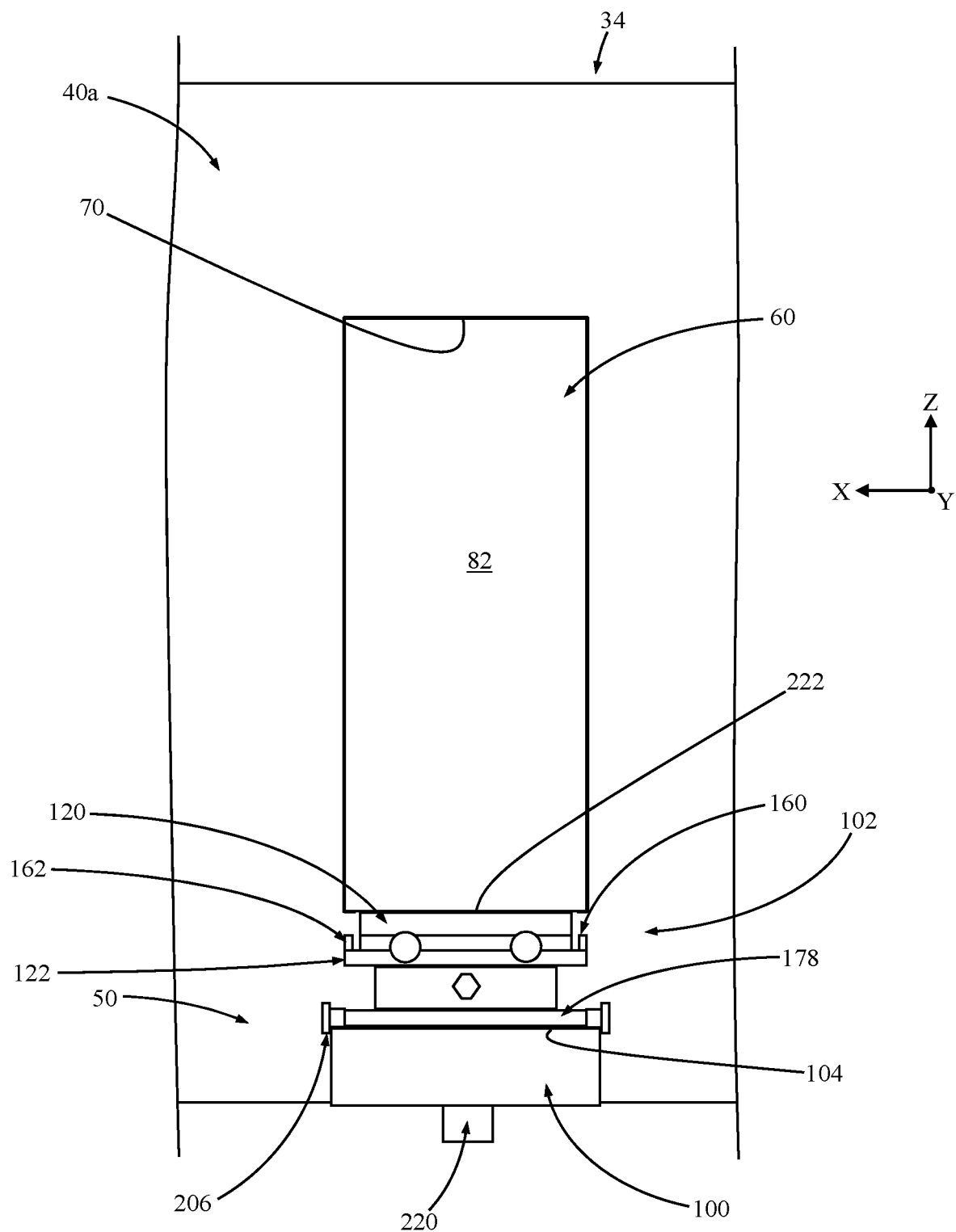
FIG. 3B is a simplified end view of the arrangement of FIG. 3A.

The support assembly 50 is shown in FIGS. 3A and 3B supporting the electrode bank 60 relative to the vessel 34. As described above, the electrode bank 60 is arranged to pass through the opening 70 in the side wall 40a; the support assembly 50 supports a portion of the electrode bank 60 outside of the vessel 34. The fixture 100 is aligned with the opening 70 and is fixed relative to the vessel 34, for example via a beam 220. Other mounting structures can alternatively be employed for spatially fixing a position of the fixture 100 relative to the vessel 34. The cart 102 is located between the electrode bank 60 and the fixture 100. The top support block 120 is in physical contact with a bottom face 222 of the electrode bank 60, and the base 178 and/or wheels 206 are in physical contact with the fixture 100. In some embodiments, the cart 102 can be located to contact the bottom face 222 of the electrode bank 60 at or adjacent the rear face 82. Regardless, the cart 102 and the fixture 100 collectively support a weight of the electrode bank 60.

In some embodiments, an interface between the cart 102 and the fixture 100 is such that the cart 102 can articulate relative to the fixture 100. For example, the cart 102 can include the wheels 206 that contact the upper surface 104 of the fixture 100. The upper surface 104 can have a track-like construction that laterally captures the wheels 206, and thus the base 178, relative to the fixture 100 (i.e., in a direction of the X axis). However, the rolling interface between the wheels 206 and the upper surface 104 is such that the cart 102 can articulate transversely relative to the fixture 100 and thus relative to the side wall 40a (i.e., in a direction of the Y axis). As described above, it can be useful to periodically advance the electrode bank 40 relative to the side wall 40a (e.g., to adjust for wearing of the front face 80). Under these and other circumstances, the cart 102 facilitates advancement of the electrode bank 60 (in a direction of the Y axis), rolling, sliding or otherwise articulating along the upper surface 104 with the electrode bank 60. As a point of reference, due to a mass or weight of the electrode bank 60, the top support block 120 inherently remains in robust frictional contact or engagement with the bottom face 222 as the electrode bank 60 is forced to advance. In other embodiments, the cart 102 can be configured to remain stationary relative to the fixture 100 with advancement of the electrode bank 60 (e.g., the top support block 120 can include or carry rollers in contact with the bottom face 222 and that rotate with advancement of the electrode bank 60).

With specific reference with to FIG. 3A, the cart 102 is depicted as supporting the electrode bank 60 in a plumb relationship with the side wall 40a. The plumb relationship can be described as the bottom face 222 and opposing upper face 224 of the electrode bank 60 being in alignment with, or level with, a plane of the corresponding edge of the side wall opening 70. Alternatively or additionally, a major plane 226 defined by the rear face 82 of the electrode bank 60 is substantially parallel (i.e., within 5 degrees of a truly parallel relationship) with a major plane 228 defined by the side wall 40a. Alternatively or additionally, a centerline 230 defined by the electrode bank 60 is substantially horizontal (i.e., within 5 degrees of a truly horizontal arrangement) and is substantially parallel with a centerline 232 defined by the side wall opening 70. Under circumstances where the electrode bank 60 is viewed as not being plumb with the side wall 40a (or for other reasons), the cart 102 can be operated to vertically raise or lower (i.e., in a direction of the Z axis) the electrode bank 60 at the rear face 82. For example, an operator can rotate the actuator 196, causing the wedge bodies 174a, 174b (one of which is visible in FIG. 3A) to move relative to the corresponding upper and lower bodies 170a/172a, 170b/172b (the first upper and lower bodies 170a, 172a being visible in FIG. 3A) as described above. With respect to the arrangement of the cart 102 as shown in FIG. 3A, where the wedge body 174a is caused to move toward the side panel 190, the lower body 172a remains spatially fixed (the force applied by the wedge body 174a onto the lower body 172a is resisted by the base 178 via the fixture 100 and ground structures such as the beam 220). As a result, the upper body 170a is forced to move upwardly, increasing the vertical gap between the upper and lower bodies 170a, 172a. The upward force applied by the wedge body 174a onto the upper body 170a is transferred to the electrode bank 60 via the bottom plate 122 (FIG. 3B) and the top support block 120. The upward force applied by the cart 102 causes the rear face 82 to move upwardly, with the electrode bank 60 effectively rotating or pivoting about a point or points of contact with the side wall 40a. Conversely, where the actuator 196 is operated to move the wedge body 174a away from the side panel 190, the upper body 170a is allowed to move vertically toward the lower body 172a (via an applied force of the electrode bank 60 onto the top support block 120), causing the rear face 82 to move downwardly (with the electrode bank 60 effectively rotating or pivoting about a point or points of contact with the side wall 40a). By altering a vertical arrangement of the cart 102 as desired, the electrode bank 60 can be rendered plumb or level with the side wall 40a.

With specific reference to FIG. 3B, in some embodiments the cart 102 can permit or facilitate lateral movement (i.e., in a direction of the X axis) of the electrode bank 60 relative to the fixture 100. As a point of reference, during a melting operation, the walls of vessel 34 (such as the side wall 40a) may expand under the intense heat. Under these and other circumstances, a lateral arrangement of the opening 70 in the side wall 40a relative to the fixture 100 may change over time. In that the electrode bank 60 is in intimate contact with the side wall 40a at the opening 70, expansion or other "shifting" of the side wall 40a is applied as a lateral force (in a direction of the X axis) onto the electrode bank 60. The top support block 120 can move with the electrode bank 60, articulating laterally (in a direction of the X axis) relative to the bottom plate 122 (and thus relative to the fixture 100) between the opposing stop members 160, 162. Where desired, an operator can laterally lock the top support block 120 relative to the bottom plate 122 via the locking mechanism 164 (FIGS. 2A and 2B) as described above.

Push Assembly 52

Returning to FIG. 1, the push assembly 52 can assume various forms for operator-prompted advancement of the electrode bank 60 relative to the vessel side wall 40a. One example of a push assembly 300 useful with some embodiments of the present disclosure is shown in greater detail in FIGS. 4A-4C, and includes a fixed frame 302, a body 304, and at least one track such as tracks 306a, 306b, 306c, 306d. Details on the various components are provided below. In general terms, the track(s) 306a, 306b, 306c, 306d interconnect the body 304 with the fixed frame 302 in a manner facilitating operator-prompted movement of the body 304 relative to the fixed frame 302. With this construction, when the fixed frame 302 is affixed to the vessel 34 (FIG. 1) and the body 304 is connected to or otherwise associated with the rear face 82 (FIG. 1) of the electrode bank 60 (FIG. 1), the push assembly 300 can be operated to apply a pushing force onto the electrode bank 60 via forced movement of the body 304 along the track(s) 306a, 306b, 306c, 306d.

The fixed frame 302 can assume various forms, and in some embodiments includes at least one side framework, such as first and second side frameworks 310a, 310b, and one or more cross-beams 312. The side frameworks can be identical in some embodiments, such that the following description of the first side framework 310a applies equally to the second side framework 310b. The side framework 310a can include a leading arm 320, a trailing arm 322 and one or more side arms 324. The arms 320, 322, 324 can be formed of a rigid material selected to maintain its structural integrity under expected forces (e.g., stainless steel), as can the joints or connections formed between the arms 320, 322, 324 (e.g., metal welding). The leading arm 320 and the trailing arm 322 are configured to receive corresponding ones of the tracks (such as tracks 306a, 306b in FIG. 4A), for example via an appropriately sized bore (one of which is labeled at 326 for the leading arm 320 and at 328 for the trailing arm 322 in FIG. 4A). The side arms 324 interconnect the leading and trailing arms 320, 322, and rigidly retain a transverse spacing (in a direction of the Y axis) between the leading and trailing arms 320, 322. Further, the leading and trailing arms 320, 322 are arranged such that the track-receiving features are aligned (e.g., the bore 326 in the leading arm 320 is aligned with the bore 328 in the trailing arm 322). While the side framework 310a is illustrated as having a quadrilateral-like perimeter shape, other shapes (and thus geometries of one or more of the arms 320, 322, 324) is equally acceptable, including regular and irregular shapes. For example, in some non-limiting embodiments, a length (i.e., dimension in a direction of the Z axis) of the leading arm 320 can be greater than a length of the trailing arm 322, with the side arms 324 forming one or more bends in extension between the leading and trailing arms 320, 322 to collectively form a D-like perimeter shape (e.g., to reduce a footprint of the side framework 310a and thus save space). Other geometry or dimensional features of the side framework 310a (e.g., transverse length (i.e., dimension in a direction of the Y axis) between the leading and trailing arms 320, 322, vertical height (i.e., dimension in a direction of the Z axis), etc.) can be selected as a function of other geometry features of the push assembly 300 as described below that in turn can be based upon expected dimensions of the electrode or electrode bank.

Figure 4A:
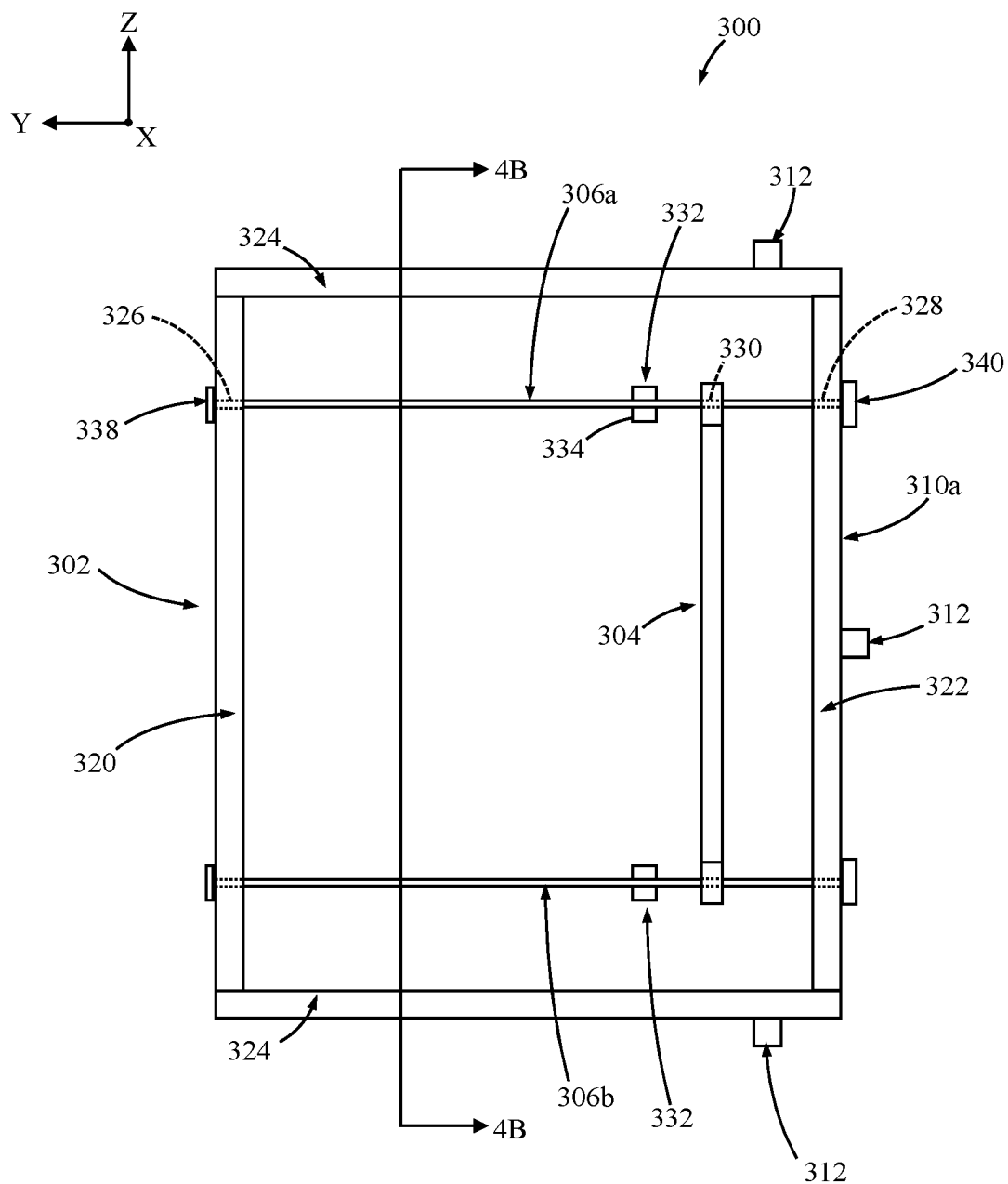
FIG. 4A is a simplified side view of a push assembly useful with the electrode interface unit of FIG. 1.
Figure 4B:
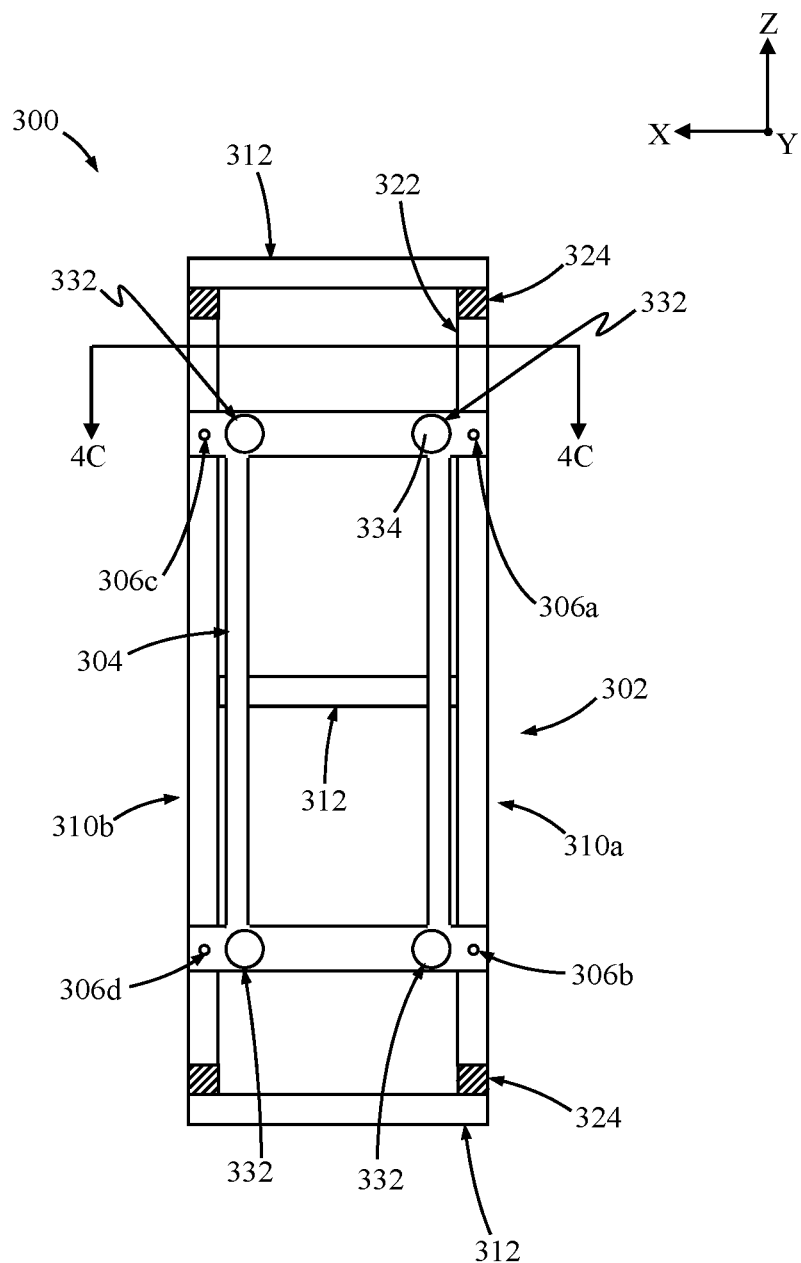
FIG. 4B is a cross-sectional view of a portion of the push assembly of FIG. 4A, taken along the line 4B-4B.
Figure 4C:
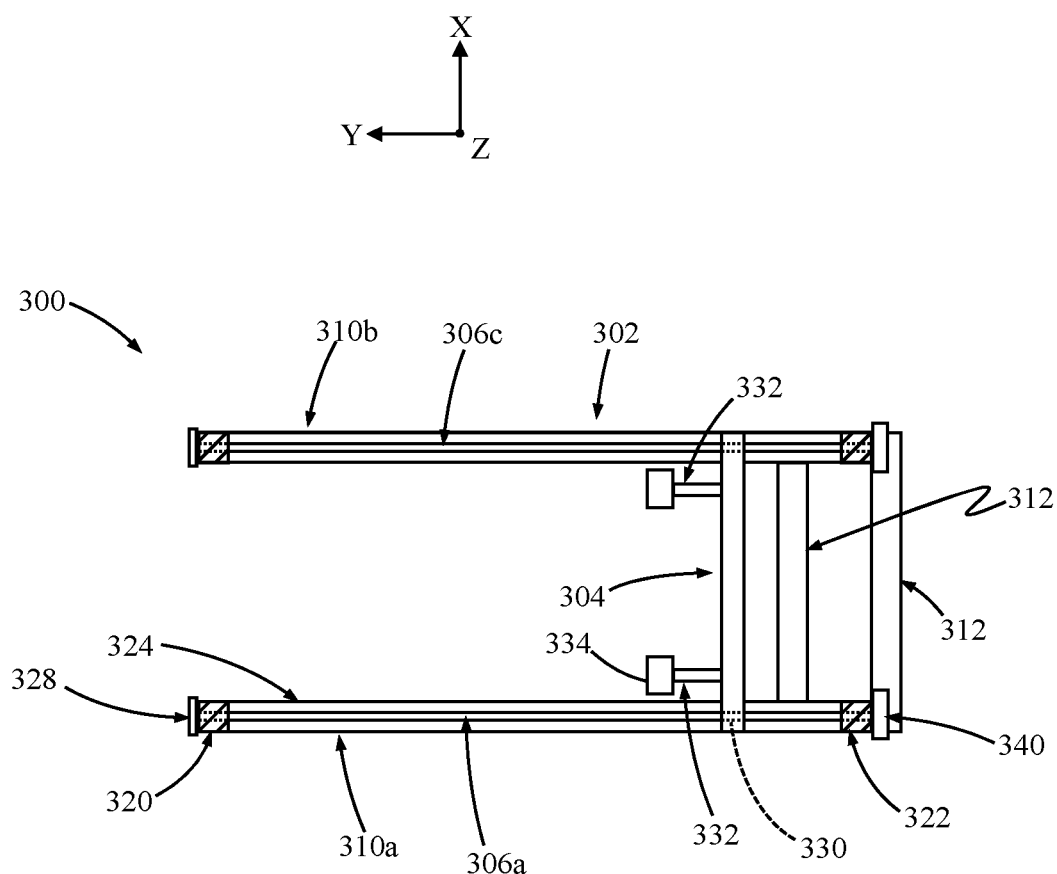
FIG. 4C is a cross-sectional view of a portion of the push assembly of FIG. 4B, taken along the line 4C-4C.

The cross-beams 312 extend between and interconnect the side frameworks 310a, 310b, and maintain the side frameworks 310a, 310b at a selected lateral spacing (i.e., dimension in a direction of the X axis). The lateral spacing between the side frameworks 310a, 310b can be selected as a function of expected parameters of an end use application as described below, for example to be greater than an expected width of the electrode bank 60 (FIG. 1) which the push assembly 300 will be employed. While FIGS. 4A-4C illustrates the fixed frame 302 as including three of the cross-beams 312, any other number, either greater or lesser, is also acceptable.

The body 304 can assume a variety of shapes and sizes, and is generally configured to establish a footprint appropriate for simultaneously interfacing with each of the tracks 306a, 306b, 306c, 306d. Thus, the footprint or shape of the body 304 as best reflected in FIG. 4B is but one non-limiting example. The body 304 is formed of a rigid material selected to maintain its structural integrity under expected forces (such as when applying a pushing force onto the electrode bank 60 (FIG. 1) as described above), and for example can be stainless steel. Regardless of an exact shape and construction, the body 304 is configured to movably receive each of the tracks 306a, 306b, 306c, 306d, for example via an appropriately sized passage (one of which is labeled at 330 in FIGS. 4A and 4C). In some embodiments, the body 304 can include or carry one or more components at or within each passages 330 that promote an translatable connection between the body 304 and the tracks 306a, 306b, 306c, 306d by which the body 304 can selectively move along the tracks 306a, 306b, 306c, 306d. For example, a threaded bushing can be provided within or formed by each of the passages 330 that threadably interfaces with the corresponding track 306a, 306b, 306c, 306d. Other coupling formats are also acceptable.

The body 304 can carry one or more components adapted to establish a connection with the rear face of an electrode (e.g., the rear face 82 (FIG. 1) of the electrode bank 60 (FIG. 1)). For example, one or more contact mechanisms 332 can be carried by the body 304, each terminating at a contact face 334 (identified for one of the contact mechanisms 332 in the views). The contact mechanisms 332 can assume various forms appropriate for physically interfacing with an electrode or electrode bank, and in some embodiments can be or include a pressure bolt device. In general terms, the pressure bolt device includes a shaft extending from the body 304 and rigidly maintaining a head that provides the contact face 334; in some embodiments, the pressure bolt device further provides a user the ability to selectively alter a spacing between the contact face 334 and the body 304 (and thus adjust or "fine tune" an applied force as described below). Other contact mechanism constructions are also acceptable, and may or may not include a pressure bolt. In yet other embodiments, the contact mechanism 332 can be omitted, with the body 304 adapted to directly contact the electrode or electrode bank.

In some embodiments, the tracks 306a, 306b, 306c, 306d can be identical such that the descriptions below with respect to the first track 306a apply equally to the remaining tracks 306b, 306c, 306d. The track 306a can assume various forms conducive to an articulating interface with the body 304, and in some embodiments can be a lead screw or similar device having an exteriorly threaded surface. With these and similar embodiments, a threaded interface can be established between the track 306a and the body 304 (e.g., via the optional threaded bushing provided with the body 304 as described above). The track 306a is sized to extend between the leading and trailing arms 320, 322 of the fixed frame 302. With optional embodiments in which the track 306a is a lead screw or similar device having an exteriorly threaded surface, the track 306a can be coupled to the leading and trailing arms 320, 322 in a manner permitting rotation of the track 306a relative to the leading and trailing arms 320, 322 without axial movement (i.e., the track 306a can be rotated relative to the leading and trailing arms 320, 322 but will not spatially move in at least a direction of the Y axis). For example, the leading arm 320 can define the bore 326 (labeled in FIG. 4A) through which the track 306a extends as described above. A fastener unit 338 is coupled to the track 306a beyond the leading arm 320 and is configured to capture the track 306a relative to the leading arm 320 and allow the track 306a to rotate. For example, the fastener unit 338 can include a threaded nut with a cotter pin through the nut and a screw to prevent the nut from backing off on the inside of the leading arm 320. Other fastening unit constructions are also acceptable. The trailing arm 322 can also define the bore 328 (labeled in FIG. 4A) sized to receive the track 306a. The track 306a extends through the bore 328 and terminates at a head 340. A size of the head 340 is greater than a diameter (or other outer dimension) of the bore 328 such that the track 306a is axially captured relative to the trailing arm 322. Further, the head 340 can provide a surface conducive to user application of a rotational force (e.g., the head 340 can be a hex nut or similar structure welded to an exterior of the track 306a). Other coupling formats for mechanically securing the track 306a relative to the trailing arm 306a are also acceptable.

While the body 304 and the track 306a have been described as incorporating a threaded interface that facilitates axial translation or articulation (i.e., in a direction of the Y axis) of the body 304 along the track 306a, other formats are also acceptable. For example, the track 306a can form or defines a series of teeth, with the body 304 configured to be axially advanced or retracted along the track 306a to a selected incremental position between adjacent ones of the teeth.

Upon final assembly, the body 304 is coupled to the tracks 306a, 306b, 306c, 306d, and is located transversely between (i.e., in a direction of the Y axis) the leading and trailing arms 320, 322. The push assembly 300 is configured such that the body 304 can be translated to different transverse positions (i.e., the body 304 can be moved in a direction of the Y axis). For example, in some embodiments each of the tracks 306a, 306b, 306c, 306d can be rotated, causing the body 304 to translate along the tracks 306a, 306b, 306c, 306d while the fixed frame 302 remains stationary.

Figure 5A:
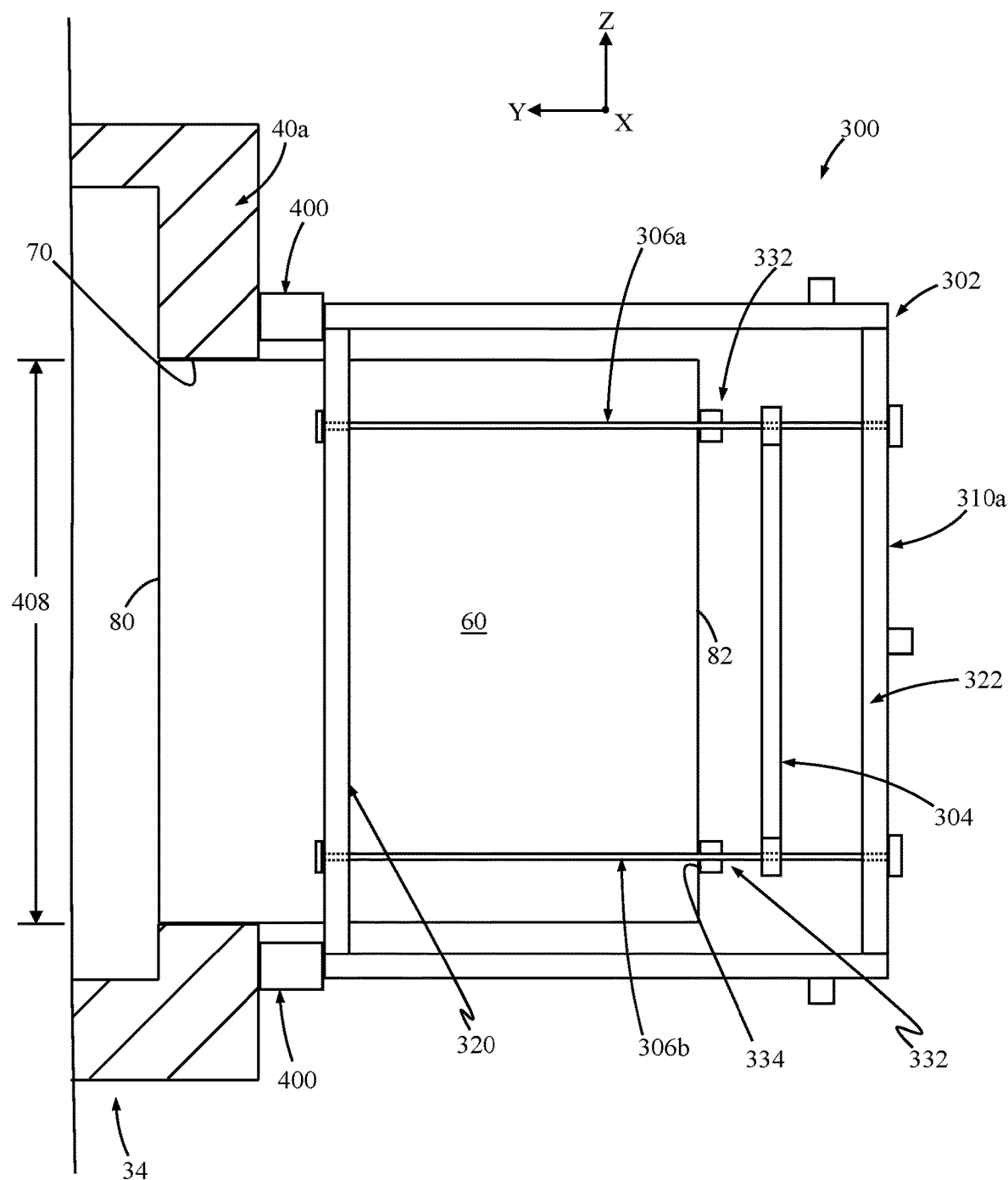
FIG. 5A is a simplified side cross-sectional view of a portion of the melting furnace system of FIG. 1, including the push assembly of FIG. 4A mounted to interface with the electrode bank.
Figure 5B:
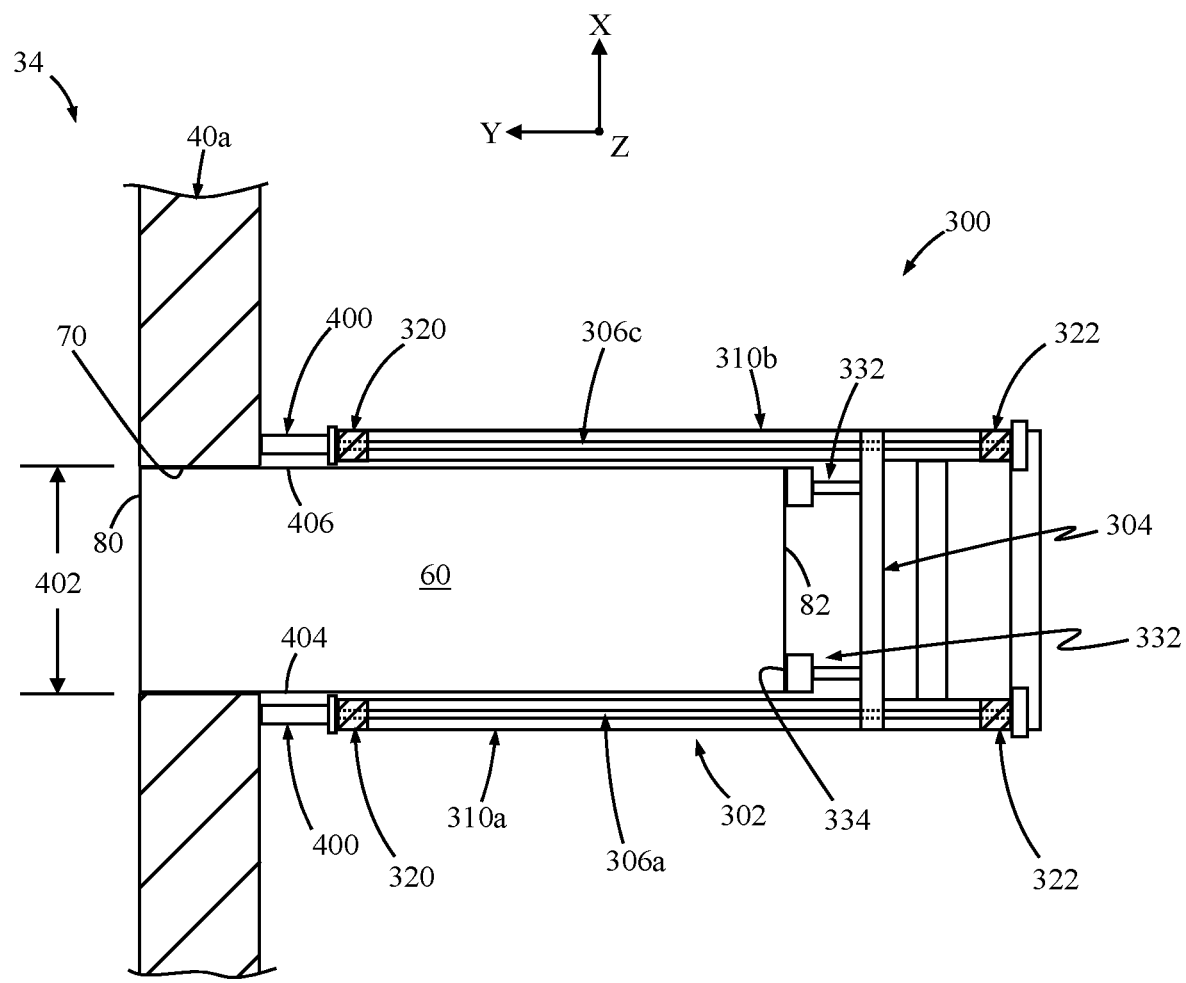
FIG. 5B is a simplified top cross-sectional view of the arrangement of FIG. 5A.

FIGS. 5A and 5B illustrate the push assembly 300 relative to the vessel 34 and the electrode bank 60. As described above, the electrode bank 60 is arranged to pass through the opening 70 in the side wall 40a. Though not shown in the view of FIG. 5A, a support assembly (e.g., the support assembly 50 described above) can be provided that supports the electrode bank 60 outside of the vessel 34. Regardless, the push assembly 300 is mounted to the vessel 34 and is arranged to interface with the rear face 82 of the electrode bank 60 as described below.

Mounting of the push assembly 300 relative to the vessel 34 can be accomplished in various manners. In some non-limiting embodiments, the fixed frame 302 is mounted to the side wall 40a by one or more brackets 400. Other fastening formats are also acceptable, and the push assembly 300 can alternatively be fixed to a structure apart from the vessel 34. Regardless, upon final assembly, the fixed frame 302 is spatially fixed relative to the side wall 40a, with the leading arm 320 of each of the side frameworks 310a, 310b located proximate (but spaced from) the side wall 40a and the trailing arm 322 located opposite the side wall 40a. The body 304 is connected to each of the tracks 306a, 306b, 306c (it being understood that in the views of FIGS. 5A and 5B, the fourth track 306d (FIG. 4B) is not visible) as described above, and is arranged between the rear face 82 of the electrode bank 60 and the trailing arm 322 of each of the side frameworks 310a, 310b. More particularly, the body 304 is transversely located (in a direction of the Y axis) such that the contact face 334 of each of the contact mechanisms 332 is proximate or in contact with the rear face 82. In some embodiments, a minimal length of the tracks 306a, 306b, 306c, 306d will extend or project beyond the trailing arms 322. Thus, the push assembly 300 occupies a relatively small space (in a direction of the Y axis) at the facility in which the vessel 34 is installed.

As reflected by FIGS. 5A and 5B, geometries or dimensions of various features of the push assembly 300 can be selected in accordance with expected dimensions of the electrode bank 60. As best seen in FIG. 5B, the fixed frame 302 can be configured to accommodate a width 402 of the electrode bank 60, and in particular to locate the side frameworks 310a, 310b, and thus the tracks 306a, 306b, 306c, 306d carried thereby, laterally (i.e., direction of the X axis) beyond corresponding sides of the electrode bank 60. For example, the fixed frame 302 is sized and shaped to locate the first track 306a adjacent but laterally spaced away from a first side 404 of the electrode bank 60, and the third track 306c adjacent but laterally spaced away from a second side 406 of the electrode bank 60. The body 304, in turn, can be sized and shaped in accordance with this same lateral spacing, and receives the so-located tracks 306a, 306b, 306c, 306d as described above. Further, the body 304 spatially locates the contact mechanisms 332 along a width thereof so as to engage the rear face 82. As best shown in FIG. 5A, the push assembly 300 can further be configured in accordance with a height 408 of the electrode bank 60 so as to locate respective ones of the contact mechanisms 332 across a span of the rear face 82, thereby applying forces more uniformly across the rear face 82. Other geometries or dimensional attributes are also acceptable.

Over time during a melting operation, the front face 80 of the electrode bank 60 can erode or wear as reflected by FIGS. 6A and 6B (that otherwise reflected the construction of FIGS. 5A and 5B at a later point in time over the course of a melting operation). Under these and other circumstances, the push assembly 300 can be manually operated to advance the electrode bank 60 relative to the side wall 40a (i.e., in a direction of the Y axis) to relocate the now-worn front face 80 at a desired position. In some embodiments, for example, a user rotates each of the tracks 306a, 306b, 306c, 306d (it being understood that the track 306d (FIG. 4B) is not visible in the view of FIGS. 6A and 6B) in a desired direction, for example via a manually-applied rotational or moment force at the corresponding head 340. Rotation of the tracks 306a, 306b, 306c, 306d causes the body 304 to articulate in the transverse direction (i.e., a direction of the Y axis) and apply a pushing force onto the rear face 82, for example via the contact mechanisms 332. In some embodiments, the heads 340 can be simultaneously rotated in the same rotational direction, and the body 304 can thus be uniformly pulled in toward the leading arms 320 (and the side wall 40a). Because the points of contact with the rear face 82 (e.g., the contact face 334 of each of the contact mechanisms 332) are commonly connected through the body 304, a relatively uniform force is applied onto the rear face 82. Further, the tracks 306a, 306b, 306c, 306d are effectively placed in tension (and not compression) as the pushing force is applied, and are supported at the opposing ends thereof (via the respective leading and trailing arms 320, 322). Thus, the tracks 306a, 306b, 306c, 306d are unlikely to bend or fail as the pushing force is applied (and can less likely to bend or fail if placed under compression at the same pushing force).

Figure 6A:
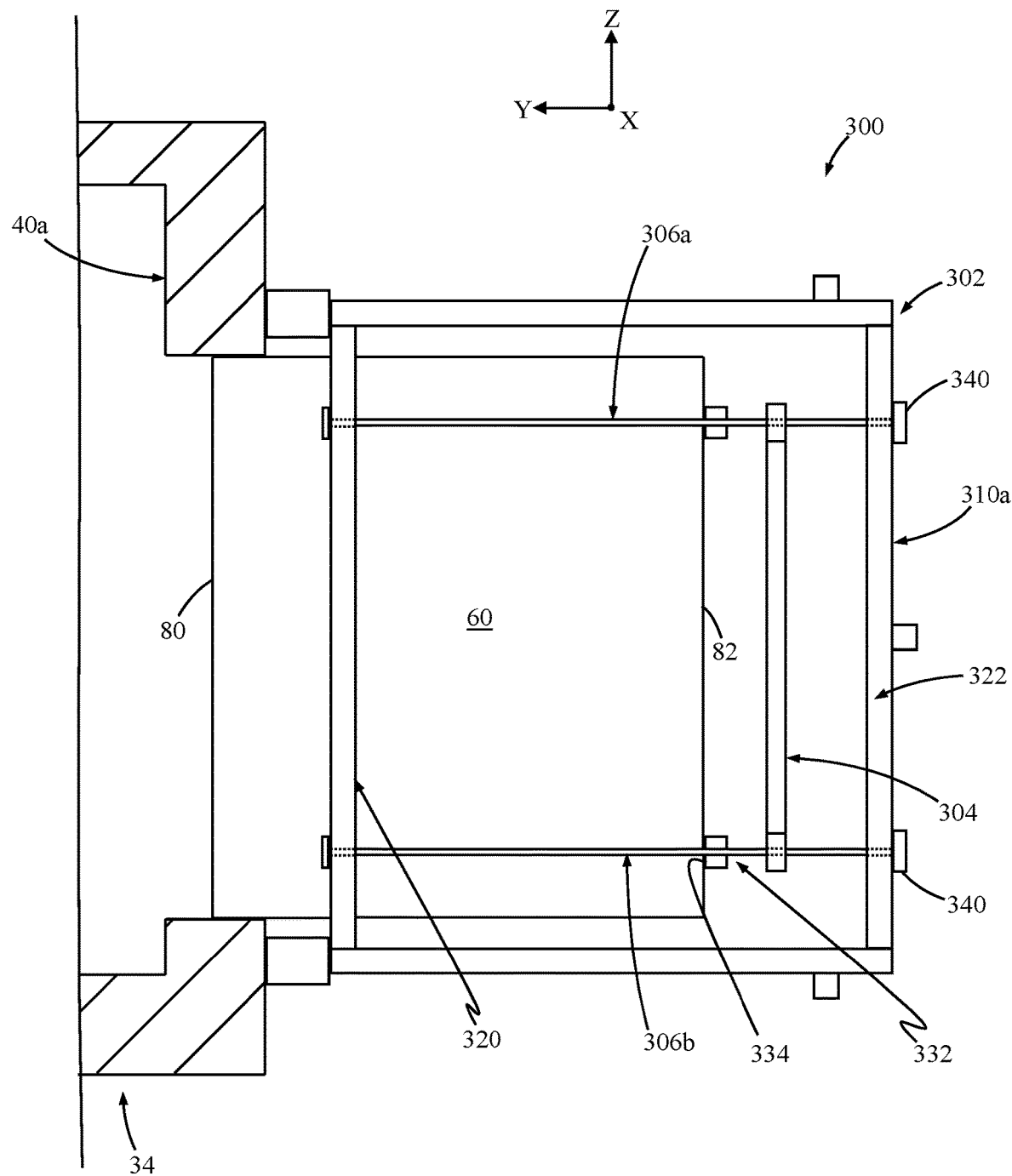
FIG. 6A is a simplified side cross-sectional view of the arrangement of FIG. 5A following wearing of the electrode bank.
Figure 6B:
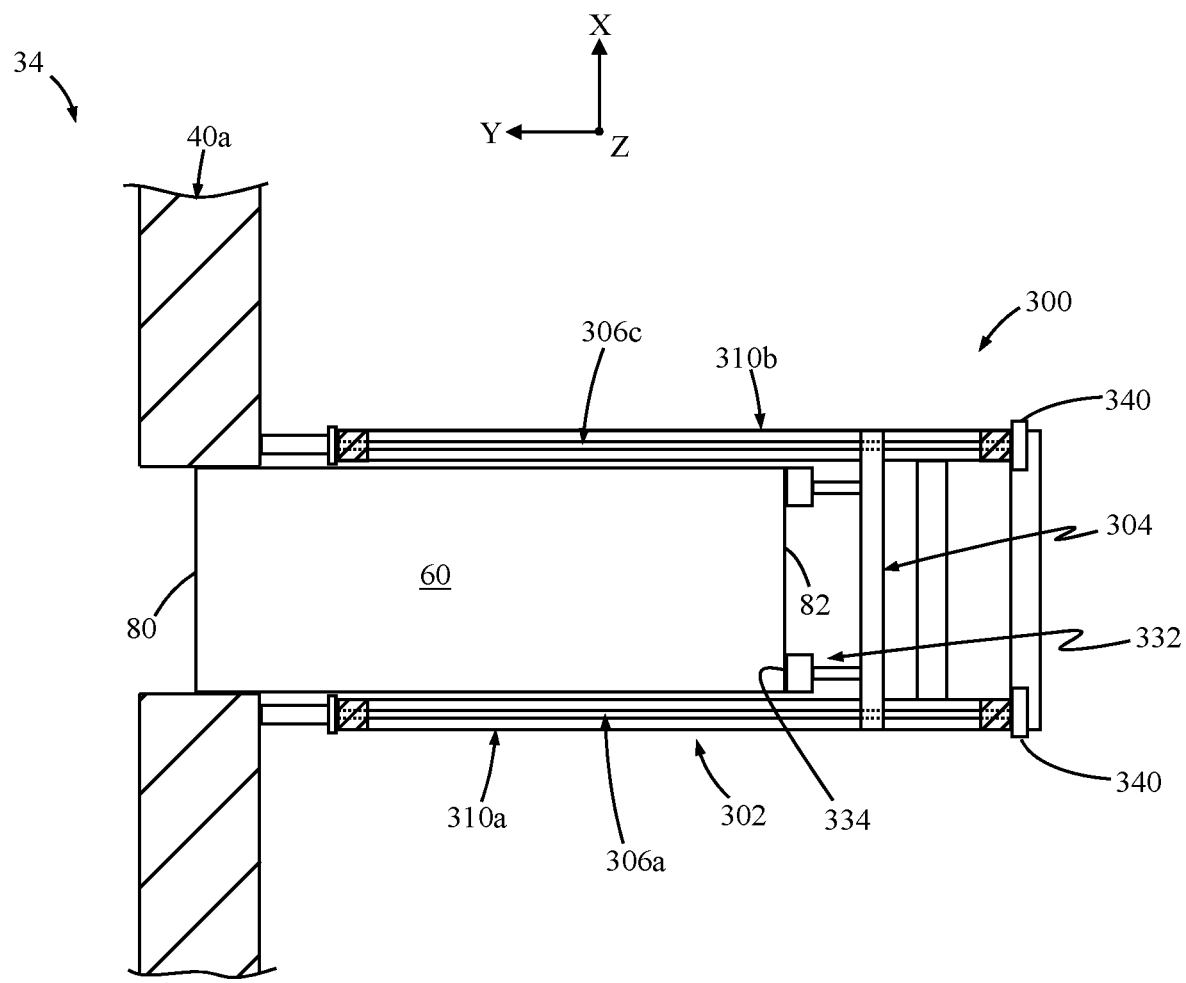
FIG. 6B is a simplified top cross-sectional view of the arrangement of FIG. 6A.
Figure 7A:
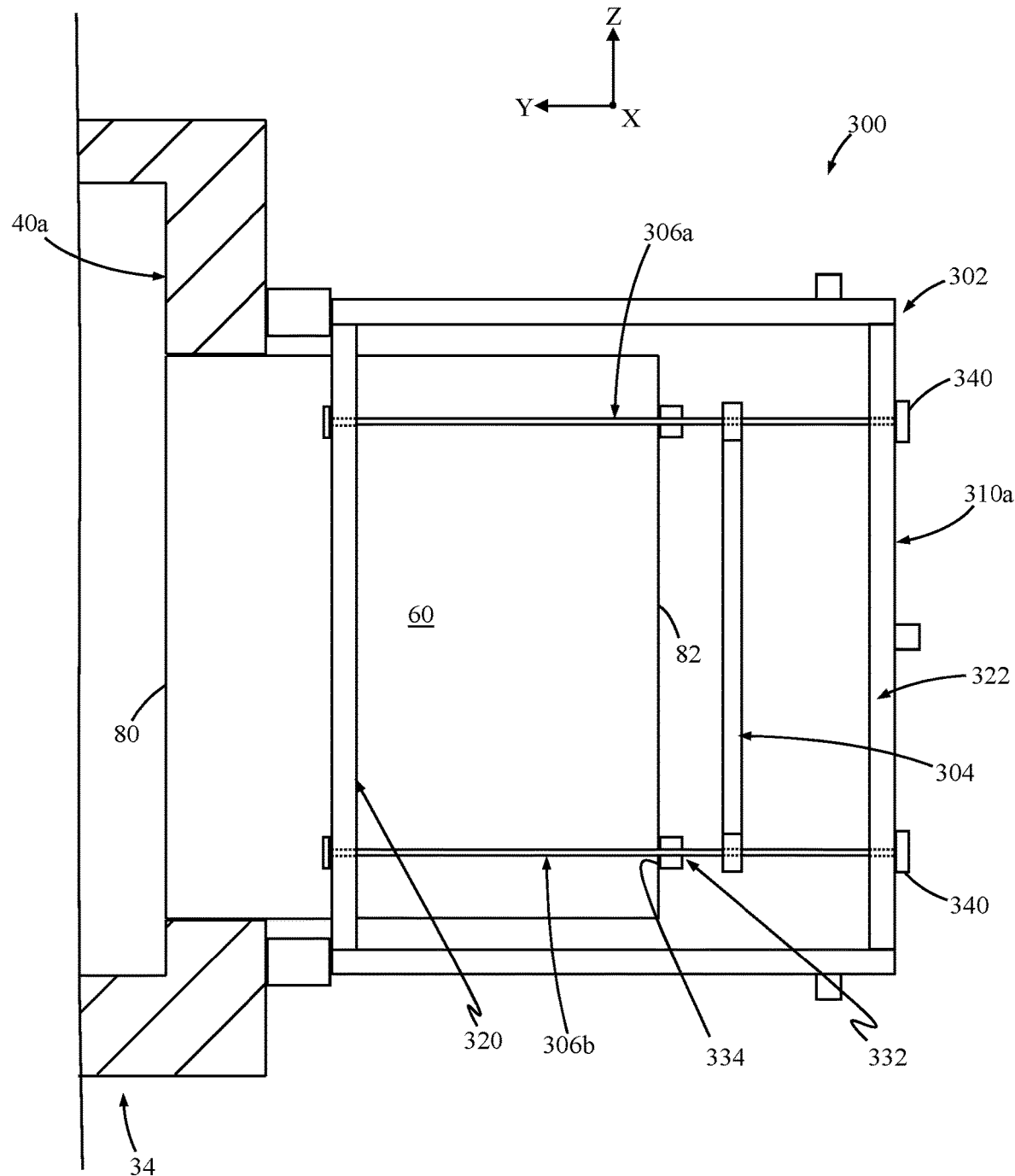
FIG. 7A is a simplified side cross-sectional view of the arrangement of FIG. 6A following operation of the push assembly to advance the electrode bank.
Figure 7B:
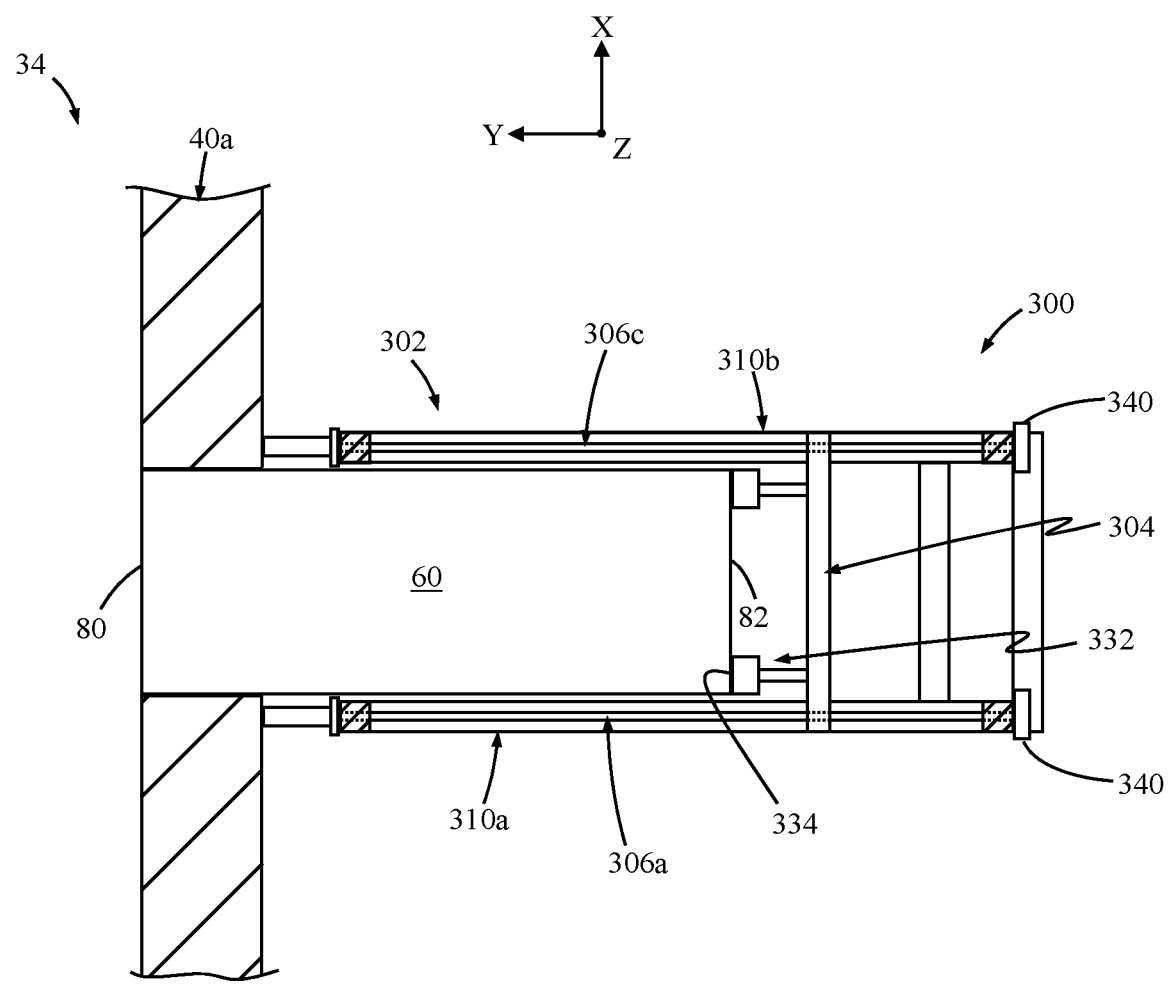
FIG. 7B is a simplified top cross-sectional view of the arrangement of FIG. 7A.

FIGS. 7A and 7B reflect the arrangement of FIGS. 6A and 6B, respectively, following application of the pushing force onto the electrode bank 60. As revealed by a comparison of the views, the body 304 has advanced laterally relative to the fixed frame 302 (i.e., in a direction of the Y axis), applying a pushing force onto the rear face 82 that in turn has caused the electrode bank 60 to advance relative to the side wall 40a. The front face 80 has been relocated to a desired position relative to the side wall 40a. In some embodiments, an operator can optionally actuate one or more of the contact mechanisms 332 (e.g., where the contact mechanisms 332 are or include a pressure bolt device or similar construction) on an individual basis to slightly adjust or "fine tune" the location of the corresponding contact face 334, and thus the force applied onto the rear face 82 at the location of the contact face 334.

The melting furnaces, electrode interface units, and methods of the present disclosure provide a marked improvement over previous designs. The electrode interface units can include one or both of the support assemblies and the push assemblies described herein. The optional support assemblies can support a large (dimensions and/or mass) electrode bank outside of the melting vessel in a manner that accommodates lateral movement of the electrode bank with, for example, expansion of the corresponding vessel wall. Further, the optional support assemblies of the present disclosure are readily operated to alter a vertical position or orientation of the electrode bank, and can facilitate transverse movement of the electrode bank (e.g., under circumstances where the electrode bank is to be advanced relative to the corresponding side wall). The optional push assemblies of the present disclosure are well-suited for manual application of a relatively uniform pushing force onto a large (dimensions and/or mass) electrode bank.

Various modifications and variations can be made to the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. A system for melting batch materials, the system comprising:
    a vessel comprising at least one side wall and defining a melting chamber;
    an electrode disposed within the side wall and comprising a front face facing the melting chamber, a rear face opposite the front face, and a length defined in a transverse direction from the rear face to the front face; and
    a push assembly comprising:
        a fixed frame fixed relative to the vessel,
        a body provided with a contact face contacting the rear face, and
        a first track comprising a threaded screw extending through a passage of the body with external threads of the threaded screw threadably interfacing with the passage of the body, and the first track rotatably connected to the fixed frame, wherein a rotation of the first track relative to the fixed frame is configured to translate the body relative to the fixed frame and the threaded screw to apply a pushing force against the rear face of the electrode with the contact face in the transverse direction without substantial transverse movement of the first track relative to the fixed frame in the transverse direction.

2. The system of claim 1, wherein the fixed frame comprises a side framework comprising a leading arm proximate the vessel and a trailing arm opposite the leading arm, and further wherein the first track extends between and is rotatably connected to the leading arm and the trailing arm.

3. The system of claim 2, wherein the body is disposed between the leading arm and the trailing arm.

4. The system of claim 1, further comprising a second track connected to the fixed frame and the body, and wherein:
    the electrode comprises a first side opposite a second side and a width defined between the first and second sides;
    the first track is located adjacent to and spaced from the first side;
    the second track is located adjacent to and spaced from the second side; and
    a distance between the first and second tracks is greater than the width.

5. The system of claim 1, further comprising a contact mechanism comprising the contact face contacting the rear face.

6. The system of claim 5, wherein the contact mechanism comprises a pressure bolt adjustably connected to the body, and the pressure bolt comprises the contact face.

7. The system of claim 1, wherein the electrode is arranged in an array of electrodes comprising an electrode bank, and further wherein the push assembly is operable to move the electrode bank relative to the side wall in the transverse direction.

8. A system for melting batch materials, the system comprising:
    a vessel comprising at least one side wall and defining a melting chamber;
    an electrode disposed within the side wall, the electrode comprising a front face facing the melting chamber, a rear face opposite the front face, a length defined in a transverse direction from the rear face to the front face, a first side opposite a second side, a width defined in a lateral direction from the first side to the second side, a bottom face opposite a top face, a height defined in a vertical direction from the bottom face to the top face, wherein the vertical direction is perpendicular to the transverse direction, the vertical direction is perpendicular to the lateral direction, and the lateral direction perpendicular to the transverse direction; and
    a support assembly comprising:
        a first support unit comprising a top support block and a bottom plate, wherein the bottom face of the electrode is supported by a bearing surface of the top support block, and the first support unit is configured to permit selective lateral movement of the top support block relative to the bottom plate in the lateral direction to alter a lateral position of the electrode relative to the side wall,
        a second support unit comprising an upper body and a lower body, wherein the first support unit is supported by the upper body, wherein the second support unit is configured to permit selective vertical movement of the upper body relative to the lower body in the vertical direction to alter a vertical position of a portion of the electrode relative to the side wall.

9. The system of claim 8, wherein the first support unit comprises a plurality of wheels interposed between the top support block and the bottom plate.

10. The system of claim 9, wherein the first support unit comprises a locking device for selectively locking the top support block from relative lateral movement with respect to the bottom plate in the lateral direction to fix a selected lateral position of the electrode relative to the side wall.

11. The system of claim 9, wherein the plurality of wheels are rotatably mounted relative to the top support block to permit the selective lateral movement of the top support block relative to the bottom plate in the lateral direction, and a rolling surface of each wheel of the plurality of wheels engaging an upper guide surface of the bottom plate, wherein the plurality of wheels support the weight of the top support block and the electrode on the upper guide surface of the bottom plate.

12. The system of claim 11, wherein each wheel of the plurality of wheels includes a guide flange that projects radially relative to the rolling surface to define an outer diameter that is greater than a diameter of the rolling surface, wherein each guide flange is configured to engage a corresponding side edge of the bottom plate to inhibit a transverse movement of the top support block relative to the bottom plate in the transverse direction.

13. The system of claim 8, wherein the second support unit comprises a wedge body disposed between the upper body and the lower body.

14. The system of claim 13, wherein the second support unit comprises an actuator mechanism for altering a position of the wedge body relative to the upper body and the lower body to permit selective vertical movement of the upper body relative to the lower body in the vertical direction to alter the vertical position of the portion of the electrode relative to the side wall.

15. The system of claim 8, wherein the second support unit comprises base and a plurality of wheels rotatably connected to the base, the base supporting the lower body.

16. The system of claim 15, wherein the support assembly comprises a track aligned with the electrode, wherein a rolling surface of each wheel of the plurality of wheels engages an upper surface of the track to permit a transverse movement support assembly relative to the track in the transverse direction to alter a transverse position of the electrode relative to the side wall.

17. The system of claim 16, wherein each wheel of the plurality of wheels includes a guide flange that projects radially relative to the rolling surface to define an outer diameter that is greater than a diameter of the rolling surface, wherein each guide flange is configured to engage the track to inhibit a lateral movement of the second support unit in the lateral direction.

18. The system of claim 8, wherein the electrode is arranged in an array of electrodes comprising an electrode bank, and further wherein the support assembly is operable to move the electrode bank relative to the side wall.

* * * * *